(12) United States Patent
Rodriguez, Jr. et al.

(10) Patent No.: US 6,568,814 B2
(45) Date of Patent: May 27, 2003

(54) INTEGRATED FRONT PROJECTION SYSTEM WITH SHAPED IMAGER AND ASSOCIATED METHOD

(75) Inventors: Ernesto M. Rodriguez, Jr., Austin, TX (US); Joseph C. Carls, Austin, TX (US); Patricia H. DeLuca, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 66 days.

(21) Appl. No.: 09/846,405

(22) Filed: May 1, 2001

(65) Prior Publication Data

US 2002/0021417 A1 Feb. 21, 2002

Related U.S. Application Data

(63) Continuation-in-part of application No. 09/261,715, filed on Mar. 3, 1999, now Pat. No. 6,179,426, and a continuation-in-part of application No. 09/616,563, filed on Jul. 14, 2000, now Pat. No. 6,394,609, and a continuation-in-part of application No. 09/746,808, filed on Dec. 22, 2000, now Pat. No. 6,520,646.

(51) Int. Cl.[7] .............................................. G03B 21/00
(52) U.S. Cl. ................................... 353/69; 353/70
(58) Field of Search ..................... 353/69, 70, 102, 353/98, 99, 122

(56) References Cited

U.S. PATENT DOCUMENTS

| | | | |
|---|---|---|---|
| 1,979,921 A | 11/1934 | Wier | 353/79 |
| 3,940,209 A | 2/1976 | Portner et al. | 353/79 |
| 3,951,534 A | 11/1976 | Altman | 353/70 |
| 4,012,115 A | 3/1977 | Brown | 350/128 |
| 4,092,064 A | 5/1978 | Puel | 353/79 |
| 4,130,352 A | 12/1978 | Overman et al. | 353/79 |
| 4,156,561 A | 5/1979 | Lucas | 353/38 |
| 4,170,400 A | * 10/1979 | Bach et al. | 353/70 |
| 4,298,246 A | 11/1981 | Iwamura | 350/122 |

(List continued on next page.)

FOREIGN PATENT DOCUMENTS

| | | | |
|---|---|---|---|
| CH | 1226687 A | 8/1999 | G03B/21/56 |
| DE | 197 12 244 A1 | 10/1998 | G03B/21/10 |

(List continued on next page.)

OTHER PUBLICATIONS

International Search Report PCT/US02/03980 mailed Sep. 3, 2002.
International Search Report PCT/US02/03747 dated Jul. 12, 2002.
International Search Report, PCT/US01/12726 mailed Nov. 13, 2001.
International Search Report, PCT/US99/14803 mailed Jun. 3, 2000.

*Primary Examiner*—William Dowling
(74) *Attorney, Agent, or Firm*—Yen Tong Florczak

(57) ABSTRACT

A front image projection device and corresponding method are disclosed that utilize a shaped imager component to pre-distort an input image and thereby compensate for the distortion expected in a screen image. The front projection device includes projection components, image generating components, and illumination components. The shaped image component may compensate at least in part for distortion introduced due to the components of the projection system. The physical configuration for the shaped imager may be determined through a modeled or actual ray trace through the projection system, and the resulting physical configuration may be a geometric shape having a curved top, a curved bottom and curved sides.

20 Claims, 23 Drawing Sheets

U.S. PATENT DOCUMENTS

| | | | |
|---|---|---|---|
| 4,436,392 A | * 3/1984 | Vanderwerf | 353/102 |
| 4,565,430 A | 1/1986 | Grunwald | 353/61 |
| 4,571,631 A | 2/1986 | Breglia et al. | |
| 4,756,615 A | 7/1988 | Hildebrand | 353/74 |
| 4,787,737 A | 11/1988 | Ogawa et al. | 353/57 |
| 4,911,529 A | 3/1990 | Van De Ven | 350/127 |
| 5,096,278 A | 3/1992 | Yoshioka et al. | 359/459 |
| 5,210,641 A | 5/1993 | Lewis | 359/448 |
| 5,274,406 A | * 12/1993 | Tejima et al. | 353/69 |
| 5,278,596 A | 1/1994 | Machtig | 353/122 |
| 5,349,400 A | 9/1994 | Kaplan et al. | 353/119 |
| 5,355,188 A | 10/1994 | Biles et al. | |
| 5,361,164 A | 11/1994 | Steliga | |
| 5,379,080 A | 1/1995 | Onozuka | |
| 5,414,521 A | 5/1995 | Ansley | |
| 5,624,173 A | 4/1997 | Davidson | 353/119 |
| 5,663,817 A | 9/1997 | Frapin et al. | 349/5 |
| 5,694,245 A | 12/1997 | Goto et al. | 359/460 |
| 5,986,634 A | 11/1999 | Alioshin et al. | |
| 6,023,369 A | 2/2000 | Goto | 359/443 |
| 6,118,501 A | * 9/2000 | Ohzawa | 349/5 |
| 6,122,865 A | 9/2000 | Branc et al. | |
| 6,328,448 B1 | * 12/2001 | Beiser | 353/70 |
| 6,354,707 B1 | * 3/2002 | Jeon et al. | 353/69 |
| 6,406,150 B1 | * 6/2002 | Burstyn | 353/122 |
| 2001/0050758 A1 | * 12/2001 | Suzuki et al. | 353/69 |
| 2002/0008856 A1 | * 1/2002 | Okamori et al | 353/69 |

FOREIGN PATENT DOCUMENTS

| | | | |
|---|---|---|---|
| EP | 0 773 678 A2 | 5/1997 | |
| EP | 0 825 480 A2 | 2/1998 | |
| EP | 0 837 351 A2 | 4/1998 | G02B/27/28 |
| EP | 0 837 351 A3 | 12/1998 | G02B/27/28 |
| EP | 1 018 842 A2 | 7/2000 | H04N/9/31 |
| EP | 1 059 555 A1 | 12/2000 | |
| JP | 02309387 | 12/1990 | |
| JP | 04110991 | 4/1992 | |
| JP | 05297465 | 11/1993 | G03B/21/60 |
| JP | 11331737 | 11/1999 | H04N/5/74 |
| JP | 2000206452 | 7/2000 | G02B/27/18 |
| WO | WO 00/33564 A1 | 6/2000 | |
| WO | WO 01 43961 A1 | 6/2001 | |

\* cited by examiner

OFF-AXIS SYSTEM W/ CORRECTION

INTEGRATED FRONT PROJECTION SYSTEM WITH SHAPED IMAGER AND ASSOCIATED METHOD

CROSS-REFERENCE TO RELATED APPLICATIONS

This application is a continuation-in-part of the following applications: application Ser. No. 09/261,715, filed on Mar. 3, 1999, entitled "Integrated Projection System" and issued as U.S. Pat. No. 6,179,426; application Ser. No. 09/616,563, filed Jul. 14, 2000, entitled "Integrated Projection System and issued as U.S. Pat. No. 6,394,609;" and application Ser. No. 09/746,808, filed Dec. 22, 2000, entitled "Integrated Front Projection System with Distortion Correction and Associated Method and issued as U.S. Pat. No. 6,520,646;" each of which is hereby incorporated by reference in its entirety.

BACKGROUND OF THE INVENTION

The present invention relates to an integrated front projection display system. In particular, the present invention relates to a low-profile integrated front projection system that coordinates specialized projection optics and an integral screen optimized to work in conjunction with the optics to create the best viewing performance and produce the necessary keystone correction.

Electronic or video display systems are devices capable of presenting video or electronically generated images. Whether for use in home-entertainment, advertising, videoconferencing, computing, data-conferencing or group presentations, the demand exists for an appropriate video display device.

Image quality remains a very important factor in choosing a video display device. However, as the need increases for display devices offering a larger picture, factors such as cost and device size and weight are becoming vital considerations. Larger display systems are preferable for group or interactive presentations. The size of the display system cabinet has proven an important factor, particularly for home or office use, where space to place a large housing or cabinet may not be available. Weight of the display system also is an important consideration, especially for portable or wall-mounted presentations.

Currently, the most common video display device is the typical CRT monitor, usually recognized as a television set. CRT devices are relatively inexpensive for applications requiring small to medium size images (image size traditionally is measured along the diagonal dimension of a rectangular screen). However, as image size increases, the massive proportions and weight of large CRT monitors become cumbersome and severely restrict the use and placement of the monitors. Also, screen curvature issues appear as the screen size increases. Finally, large CRT monitors consume a substantial amount of electrical power and produce electromagnetic radiation.

One alternative to conventional CRT monitors is rear projection television. Rear projection television generally comprises a projection mechanism or engine contained within a large housing for projection up on the rear of a screen. Back-projection screens are designed so that the projection mechanism and the viewer are on opposite sides of the screen. The screen has light transmitting properties to direct the transmitted image to the, viewer.

By their very nature, rear projection systems require space behind the screen to accommodate the projection volume needed for expansion of the image beam. As background and ambient reflected light may seriously degrade a rear projected image, a housing or cabinet generally encloses the projection volume. The housing may contain a mirror or mirrors so as to fold the optical path and reduce the depth of the housing. The need for "behind-the-screen" space precludes the placing of a rear projection display on a wall.

A new category of video presentation systems includes so-called thin Plasma displays. Much attention has been given to the ability of plasma displays to provide a relatively thin (about 75–100 mm) cabinet, which may be placed on a wall as a picture display in an integrated compact package. However, at the present time, plasma displays 3 are costly and suffer from the disadvantages of low intensity (approx. 200–400 cd/m$^2$ range) and difficulty in making repairs. Plasma display panels are heavy (~80–100 lbs., ~36–45 kg.), and walls on which they are placed may require structural strengthening.

A traditional type of video presentation device that has not received the same degree of attention for newer applications is front-projection systems. A front-projection system is one that has the projection mechanism and the viewer on the same side of the screen. Front projection systems present many different optical and arrangement challenges not present in rear projection systems, as the image is reflected back to the audience, rather than transmitted. An example of front projection systems is the use of portable front projectors and a front projection screen, for use in meeting room settings or in locations such as an airplane cabin.

One of the advantages of front projectors is the size of the projection engine. Electronic front projectors traditionally have been designed for the smallest possible "footprint," a term used to describe the area occupied on a table or bench, by the projector. Portable front projectors have been devised having a weight of about 5–20 lb.

Nevertheless, front projection systems have traditionally not been considered attractive for newer interactive applications because of factors such as blocking of the image by the projector or the presenter, poor image brightness, image distortion and setup difficulties.

Traditional electronic front projectors typically require a room that may afford the projection volume necessary for image expansion without any physical obstructions. Although images may be projected upon a large clear flat surface, such as a wall, better image quality is achieved by the use of a separate screen. FIGS. 1 and 2 illustrate a traditional front projection system. A projector 10 is placed on a table or other elevated surface to project an image upon a screen or projection surface 20. Those familiar with the use of electronic projectors will appreciate that tilting the projector below the normal axis of the screen produces a trapezoidal shape distortion of the image, known as a keystone effect. Most new electronic projectors offer a limited degree of keystone correction. However, as may be appreciated in FIG. 2, the placement of the projector may still interfere with the line of sight of the audience.

Of greater significance is the fact that to achieve a suitable image size, and also due to focus limitations, the projector 10 requires a certain "projection zone" in front of the screen 20. Table A lists the published specifications for some common electronic projectors currently in the market.

TABLE A

| Projector Type | Lens Focal Length | Imager Diagonal | Smallest Screen Diagonal | Shortest Throw Distance | Throw Ratio | Maximum Keystone Correction |
|---|---|---|---|---|---|---|
| CTX Opto ExPro 580 | * | 163 mm Transmissive LCD | 1.0 m | 1.1 m | 1.1 | 20° offset/optical |
| InFocus LP425 | * | 18 mm Reflective DMD | 1.3 m | 1.5 m | 1.2 | 18° offset |
| Chisholm Dakota X800 | 43–58.5 mm | 23 mm Reflective LCD | 0.55 m | 1.2 m | 2.2 | 15° electronic |
| Epson Powerlite 7300 | 55–72 mm | 33.5 Transmissive LCD | 0.58 m | 1.1 m | 1.9 | * |
| Proxima Impression A2 | 45–59 mm | 23 mm Transmissive LCD | 0.5 m | 1.0 m | 2.0 | 12° offset |
| 3M MP8620 | 167 mm | 163 mm Transmissive LCD | 1.0 m | 1.2 m | 1.2 | 16° offset/optical |

* Not given in published specifications

Throw distance is defined as the distance from the projection lens to the projection screen. Throw ratio usually is defined as the ratio of throw distance to screen diagonal.

The shortest throw distance available for the listed projectors is one meter. To achieve a larger image, between 40 to 60 inches (~1 to 1.5 meters), most projectors must be positioned even farther away, at least 8 to 12 feet (approximately 2.5 to 3.7 meters) away from the wall or screen.

The existence of this "projection zone" in front of the screen prevents the viewer from interacting closely with the projected image. If the presenter, for example, wishes to approach the image, the presenter will block the projection and cast a shadow on the screen.

Traditional integrated projectors require optical adjustment, such as focusing every time the projector is repositioned, as well as mechanical adjustment, such as raising of front support feet. Electronic connections, such as those to a laptop computer, generally are made directly to the projector, thus necessitating that the projector be readily accessible to the presenter or that the presenter runs the necessary wiring in advance.

Another problem with front projectors is the interference by ambient light. In a traditional front projector a significant portion of the projected light is scattered and is not reflected back to the audience. The loss of the light results in diminished image brightness. Accordingly, a highly reflective screen is desirable. However, the more reflective the screen, the larger the possible degradation of the projected image by ambient light sources. The present solution, when viewing high quality projection systems such as 35 mm photographic color slide presentation systems, is to attempt to extinguish an ambient lights. In some very critical viewing situations, an attempt has been made even to control the re-reflection of light originating from the projector itself.

Some screen designers have attempted to address the ambient light problem with "mono-directional reflection" screens, that is, a projection screen attempts to absorb fight not originating from the projector, while maximizing the reflection of incident light originating from the direction of the projector. Nevertheless, since portable projectors are, in fact, portable and are used at various throw distances and projection angles, it has proven very difficult to optimize a screen for all possible projector positions and optical characteristics.

An alternative is to design a dedicated projection facility. Such a design necessitates a dedicated conference room, in which the projector and screen position, as well as the projector's optical characteristics, are rigorously controlled and calibrated. Structural elements may be used to suspend the selected projector from the ceiling. Once calibrated, such system would be permanently stationed. Such a facility may suffer from high costs and lack of portability.

Another issue that prevents optimal performance by front projectors is the keystone effect. If projectors are placed off-center from the screen, keystoning will occur. Keystoning is a particular image distortion where the projection of a rectangular or square image results in a screen image that resembles a keystone, that is a trapezoid having parallel upper and lower sides, but said sides being of different lengths.

Presently, to the applicants' knowledge, the available optical keystone correction in commercially available portable electronic front projectors is between 10° to 20°.

The need remains for a large screen video presentation system that offers efficient space utilization, lower weight and attractive pricing. Such a system should preferably yield bright, high-quality images in room light conditions. Furthermore, such a system would preferably correct various distortion components within a displayed image.

SUMMARY OF THE INVENTION

The present invention is a projection system and associated method that improve distortion components within a projected image by using a shaped imager component. The shaped imager component is physically configured to pre-distort an input image to compensate at least in part for expected distortion in the projected image, for example, distortion due to the components of the projection system and distortion due to the off-axis projection. The physical configuration for the shaped imager may be determined through a modeled or actual ray trace through the projection system, and the resulting physical configuration may be a geometric shape having a curved top, a curved bottom and curved sides. In this way, distortion correction provided by the optics and/or the electronics of the projection system can be reduced or possibly eliminated.

In one embodiment, the present invention is a front image projection device, including projection components operable to project an input image onto a projection screen to produce a screen image, illumination components coupled to the projection components, and image generating components operable to generate the input image, where the image generating components have a shaped imager component physically configured to pre-distort the input image to compensate at least in part for expected distortion in the displayed screen image, with the physical configuration being determined at least in part from a ray trace. The ray trace may be, for example, an actual ray trace or a modeled ray trace through the projection system. In more detailed aspects, the projection screen may be coupled to and integrated with the projection device, and the projection components may have off-axis optics with a throw-to-screen diagonal ratio of at most 1. In addition, the projection components may produce optical and geometric distortion in the screen image with respect to the input image, and the shaped imager component may have a calculated geometric shape to compensate for the optical and geometric distortion of the projection components. Still further, the shaped imager component may be a plurality of rows of pixels, and the number of pixels per row may be the same with the spacing between each pixel within a given row being different for different rows of pixels.

In another embodiment, the present invention is an integrated front image projection system, including a front projection screen, a movable arm coupled to the front projection screen and having a storage position and a projection position, a front projection head coupled to the arm distal the front projection screen, projection components housed within the front projection head and operable to project an input image onto a projection screen thereby displaying a screen image, illumination components coupled to the projection components, and image generating components operable to generate the input image, where the image generating components have a shaped imager component physically configured to pre-distort the input image to compensate at least in part for expected distortion in the displayed screen image, with the physical configuration comprising a geometric shape having a curved top, a curved bottom and curved sides. In more detailed aspects, the projection components may have off-axis optics with a throw-to-screen diagonal ratio of at most 1. In addition, the projection components may produce optical and geometric distortion in the screen image with respect to the input image.

In a further embodiment, the present invention is a method for projecting a corrected screen image with a front projection device, including the steps of providing a front projection device configured to project an input image onto a projection screen thereby displaying a screen image, and compensating for distortion in the screen image caused by components of the front projection device at least in part by utilizing a shaped imager component physically configured to pre-distort an input image, with the physical configuration comprising a geometric shape having a curved top, a curved bottom and curved sides. In more detailed respects, the method may also include projecting the input image with the front projection device to form a screen image that has distortion corrected by the shaped imager. In addition, this projection may be accomplished using components that have off-axis optics with a throw-to-screen diagonal ratio of at most 1. Still further, the distortion may be optical and geometric distortion in the screen image with respect to the input image, and the shaped imager component may have a calculated geometric shape to compensate for the optical and geometric distortion of the projection components. In addition, the shaped imager component may include a plurality of rows of pixels, and the number of pixels in each row may be constant with the spacing between each pixel in a given row is different for different rows of pixels.

In yet another embodiment, the present invention is an imager for a projection system including a shaped imager component physically configured with a curved top, a curved bottom and curved sides to pre-distort an input image to compensate at least in part for expected distortion in a projected image. In more detailed aspects, the shaped imager component may have a plurality of rows of pixels, and the number of pixels per row may be the same with the spacing between each pixel within a given row being different for different rows of pixels.

In another embodiment, the present invention is a method for determining a physical configuration for a shaped imager to provide distortion correction in a projected image, including determining optical projection parameters for the projection system including projection angle and throw ratio, conducting a ray trace of the projection system to determine distortion in a projected image, and utilizing the ray trace to physically configure a shaped imager to correct at least in part for the distortion of the projected image. In more detailed aspects, the conducting step may include modeling the projection system to conduct the ray trace or conducting an actual ray trace through the projection system.

DETAILED DESCRIPTION OF THE INVENTION

Figure 1:
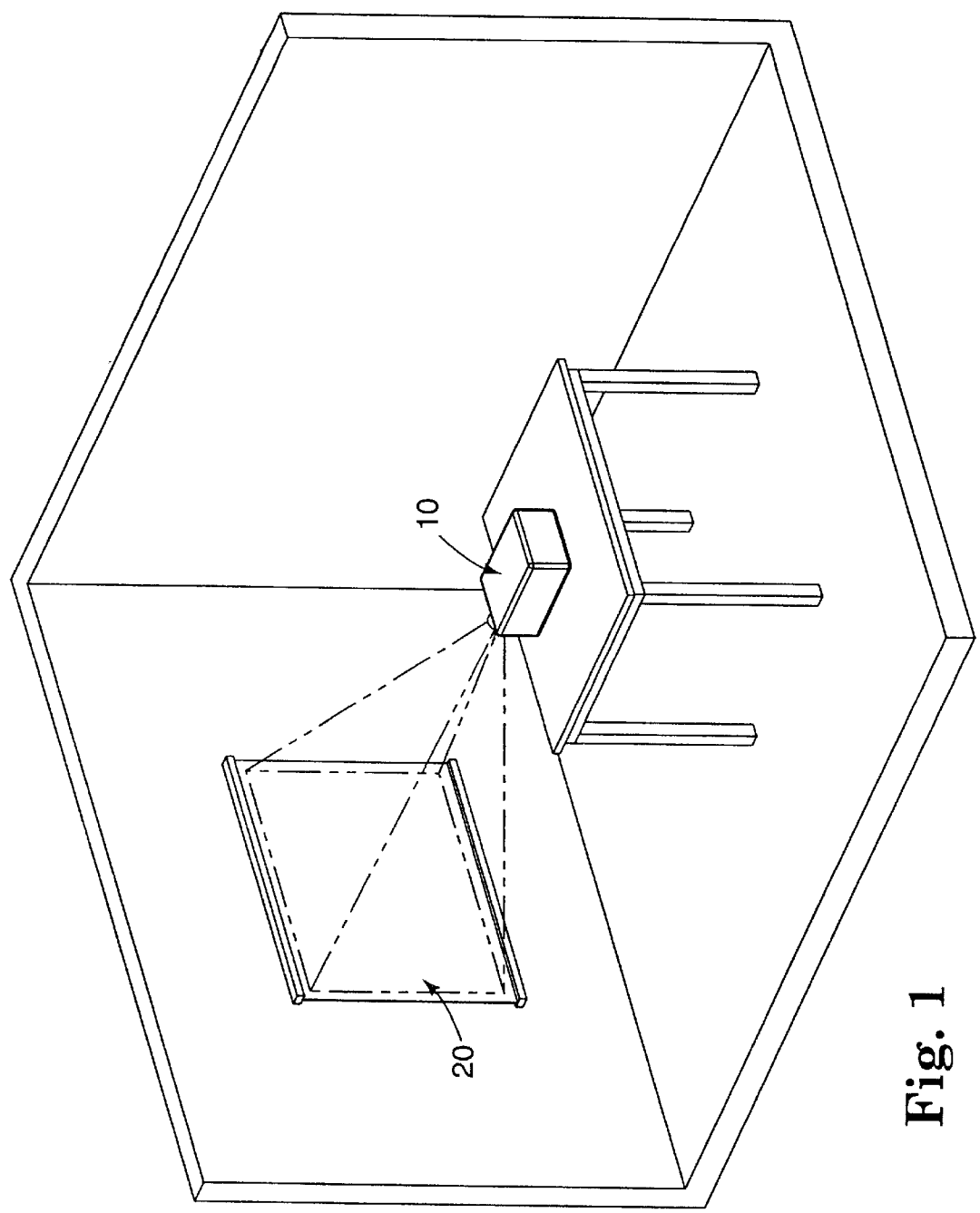
FIG. 1 is a perspective view of a traditional projection device and screen arrangement.
Figure 2:
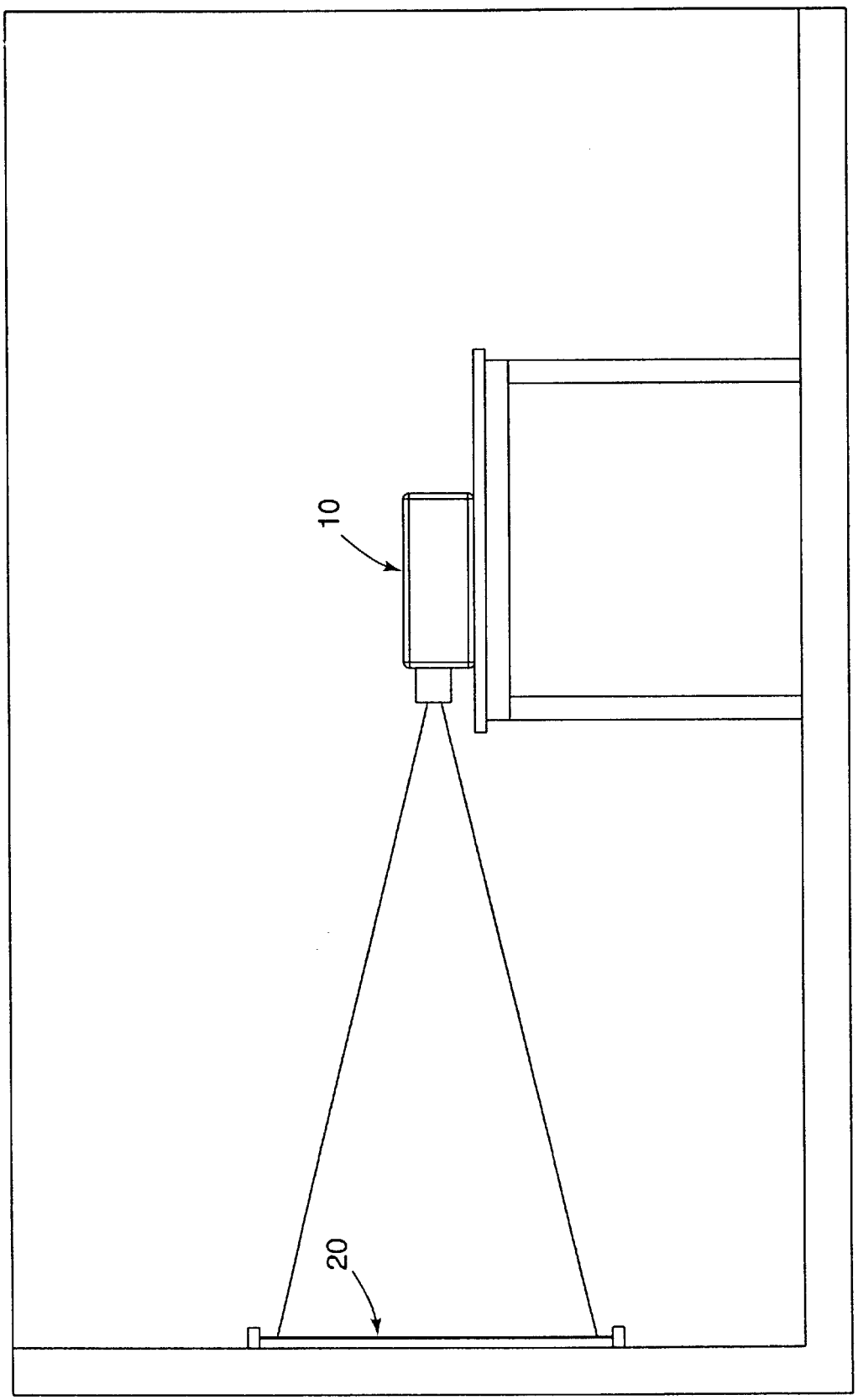
FIG. 2 is an elevation side view of the arrangement illustrated in FIG. 1.
Figure 3:
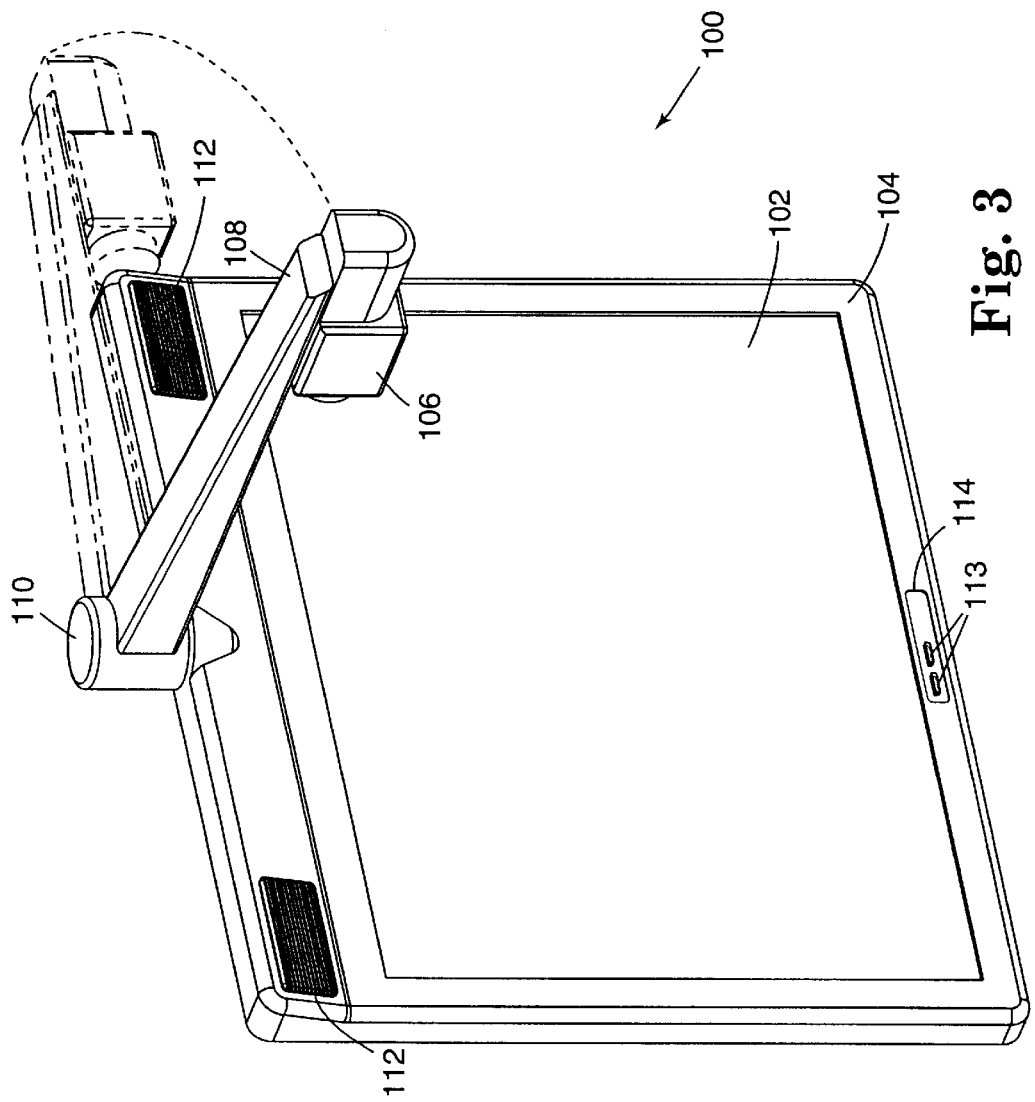
FIG. 3 is a perspective view of an integrated front projection system in is accordance with the present invention in the use or projection position.

FIGS. 3–6 illustrate a first exemplary embodiment of an integrated front projection system 100 in accordance with the present invention. This front projection system integrates an optical engine, having modular control and power supply electronics, and includes a dedicated projection screen 102 mounted on a frame 104. A projection head 106 may be pivotally mounted by an arm 108 to a center top portion of the frame 104 at a hinge unit 110. The arm 108 may be rotated out from 0° to about 90° allowing the projection head 106 to pivot from a closed or storage position to an opened or projection position.

The screen 102 is optically coupled to the projection head. The screen 102 may be a flexible material extended over frame 104 or may be a rigid component. In an alternative embodiment, both the screen and the frame are made of an integral sheet of material. The screen 102 may include multiple-layers or special coatings, such as to allow its use as an erasable whiteboard as described in U.S. Pat. No. 5,361,164; assigned to Walltalkers, Barrington, Ill.

The frame 104 contains and supports other components of the system. The frame 104 may house additional components such, as integrated speakers 112, input and output-jacks 113, and a control panel 114. In the present exemplary embodiment, the mechanical infrastructure of the projection system 100, the arm 108 and the frame 104, include lightweight materials such as aluminum, magnesium or plastic composites. The entire projection system, accordingly, is relatively light (20–25 pounds, 9–11 kilograms).

Figure 4:
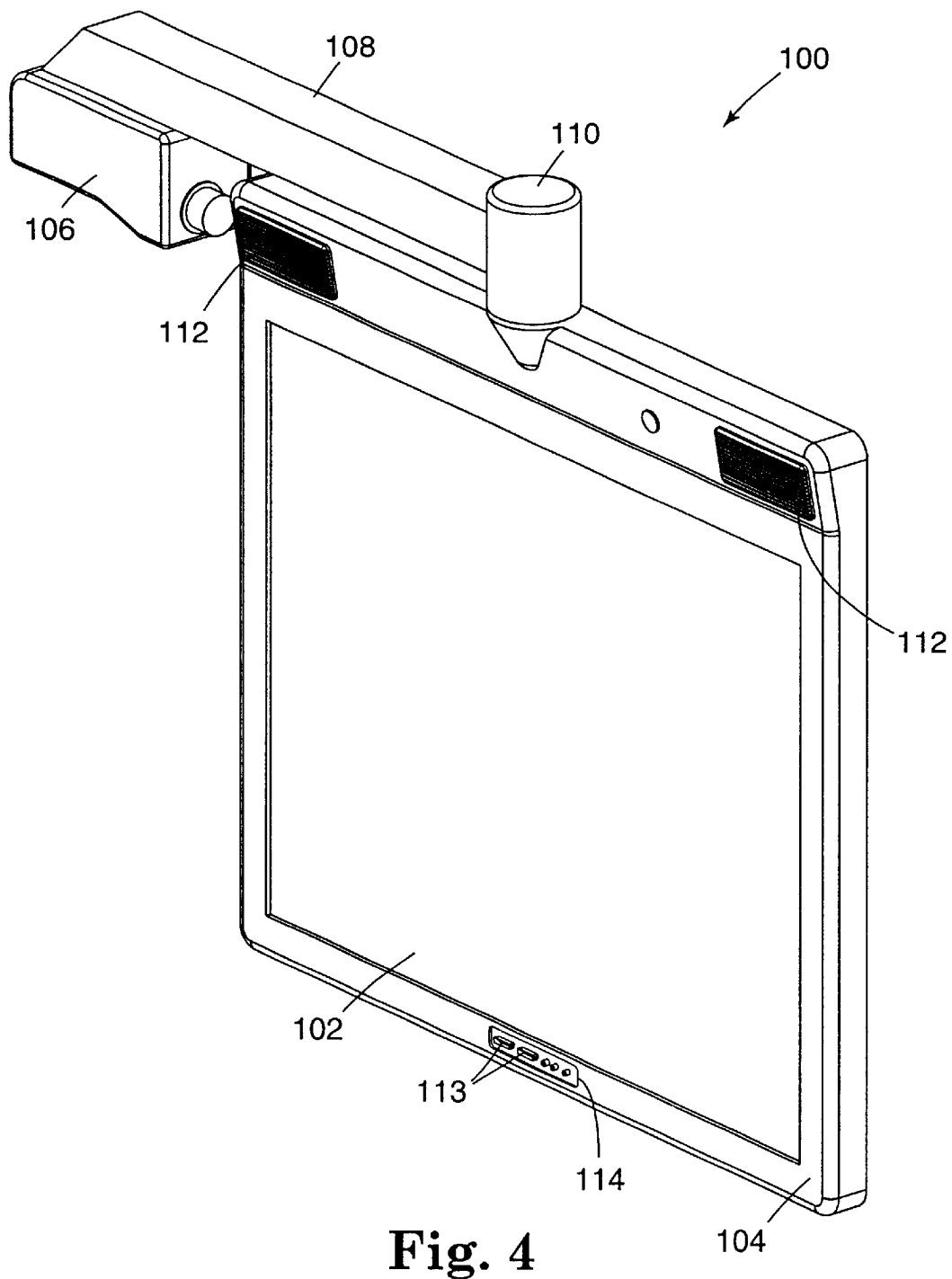
FIG. 4 is a perspective view of the integrated front projection system illustrated in FIG. 3 in the closed or storage position.

In the present exemplary embodiment, the arm 108 may be rigid and hollow. The arm 108 comprises die cast aluminum or magnesium, or other suitable materials, surrounded by a hard plastic shell. At the top and center of the frame 104, the hinge unit 10 allows the projection arm 108 and head 106 to pivot between a closed (storage) position and an open (use) position. FIG. 4 illustrates the projection system 100 in a closed or storage position. When not in use, the arm 108 may be kept in the closed position as to be substantially parallel with the frame 104, and thus present no obstruction to objects that may be moving in the space in front of the frame 104. Although the arm is shown folded back to an audience left position, the system may be adaptable to allow storage of the arm and projection head to an audience right position. An ability to select storage position may be valuable in avoiding obstacles present in the projection area prior to the installation of the system. The ability of the arm 108 to rotate contributes to the projection system's minimal thickness, approximately 2–3 inches (5–7.5 cm.), in the storage position.

The system 100 allows for the projection head 106 to be placed in an exact pivotal registration in the operating or projection mode in relation to the optical screen 102. In system 100, use position is at a normal arm angle with respect to the screen and generally above the screen. However, other embodiments may be designed around other predetermined positions, such as to the sides, in the center, or at the bottom of the screen. Movement between the two positions may be assisted manually or may be motor-driven.

In the present embodiment, an electrical motor 116 residing within the hinge unit 110 controls the movement of the arm 108. The motor 116 may be AC, DC, manually driven by detentes, over-center-cam (spring loaded) or any other suitable type of mechanism that provides reliable repeatable positioning. The motor 116 may be a precision guided gear drive motor having two limit sensor switches to accurately position the arm 108, and accordingly, the projection head 106, in precise and repeatable closed and open positions.

The movement of the arm 108 and the functions of the projector system 100 may be controlled through the control panel 114, a remote control (not shown), or other control mechanism. While the arm 108 of the projection system 100 is pivotally fixed at a single point, those skilled in the art will readily appreciate that a variety of different linkage and/or pivoting mechanisms may be implemented within the spirit of the present invention. In alternative embodiments, the head and arm may include additional hinge or telescopic movement and the arm may be coupled to other portions of the frame or to a wall or post.

As explained in more detail in relation to FIGS. 14–17, the system 100 optimizes the coupling of the projection engine with the exact positioning of the head 106 in relation to the screen 102 to yield high contrast, brightest enhancement, image uniformity, optimal image position, and sharp focus. Since the optical parameters of the projection engine are known and selected for compatibility and the exact position of the projector head 106 in the use position is known and predetermined, the exemplary screen 102 may be designed and optimized to provide maximum illumination for the audience while reducing interference by ambient light.

When active, the projection system 100 generates a beam of light having a plurality of light rays 162. In relation to a coordinate system wherein the screen defines a z-plane, each light ray 162 includes components along both the horizontal x-plane and the vertical y-plane. The angle of incidence of each light ray 162 upon the screen 102 depends on the optical characteristics of the projector, such as f-number, and the position of the projection head 106 in relation to the screen 102.

Figure 14:
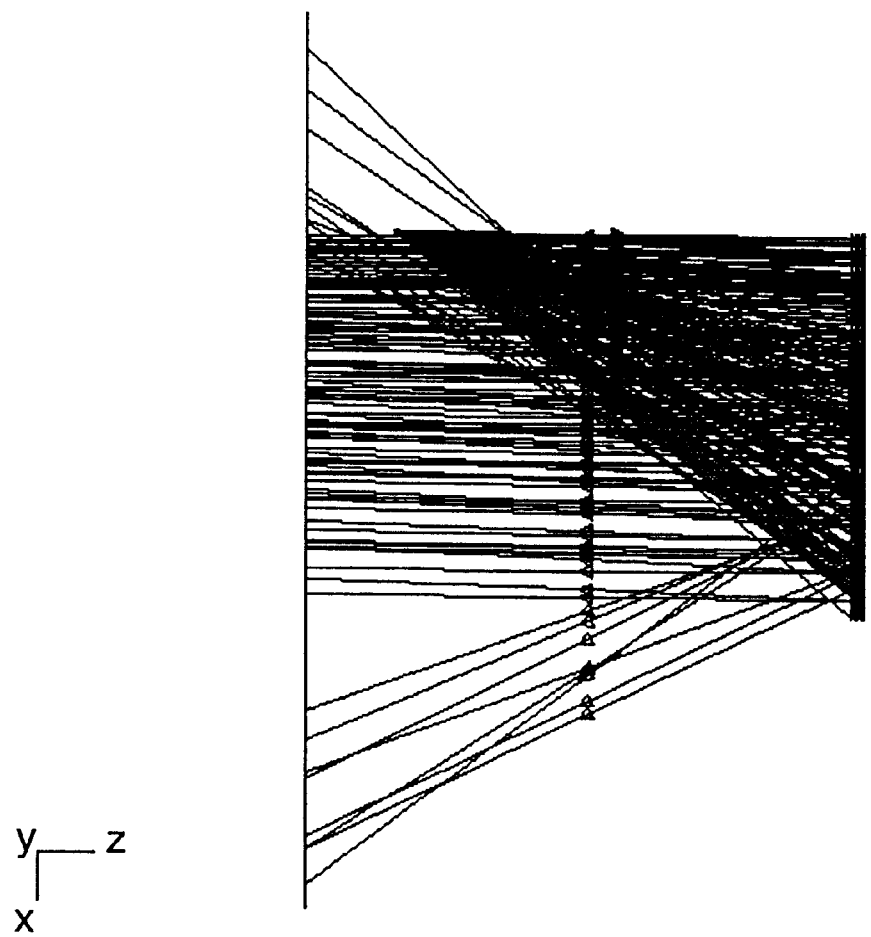
FIG. 14 is a side elevation view of the vertical reflection pattern of a controlled light distribution front projection screen in accordance with the present invention.

FIG. 14 is a side elevation of a vertical axis ray diagram, illustrating the reflection of light rays 162 emitted by projection system 100. Point 60 is the known precise location of the ideal point source for projection lens 140 (illustrated in FIG. 6) when the projection head 106 is in the "USE" position. The angles of incidence of the light rays 162 on the screen increase along the positive x-direction (see directional axis in FIG. 14).

In a traditional screen, the light rays 162 would each be reflected in accordance with their angle of incidence. Especially at the sharp projection angle of system 100, the resulting light pattern would be scattered, with only a portion of the light rays reaching the audience. To compensate for the graduated increase in incidence angles, the screen 102 includes a vertically graduated reflection pattern oriented to receive the projected light rays 162 at the expected incidence angle for each point on the screen 102 and to reflect the rays approximately at normal angle along the vertical plane. The light rays 162 are reflected in a direction vertically close to normal because that corresponds to the expected location of the audience. In alternative embodiments where the audience is expected to be in a different position, a different reflection pattern may be implemented.

Figure 15:
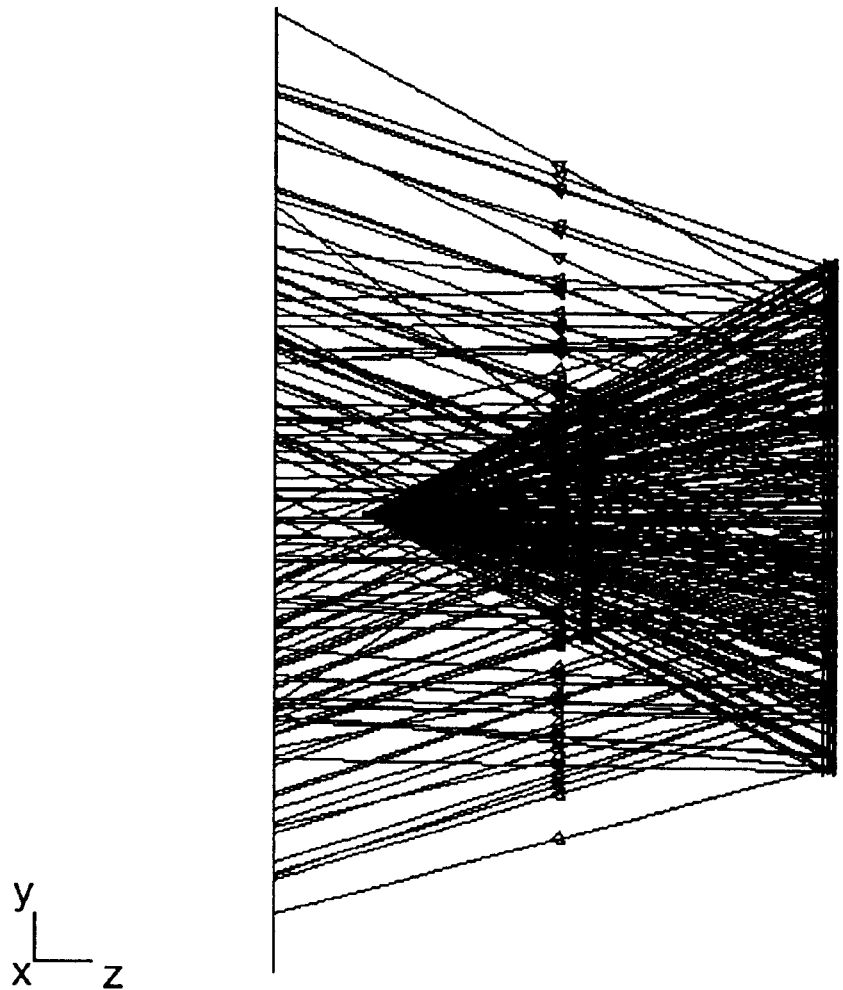
FIG. 15 is a plan view of the horizontal reflection pattern of the front projection system illustrated in FIG. 14.

FIG. 15 illustrates a top plan view of the horizontal distribution of the light emanating from point 60. As the audience is expected to be horizontally distributed, the horizontal reflection pattern of the screen is arranged to provide a wider illumination spread in the horizontal direction.

Figure 16:
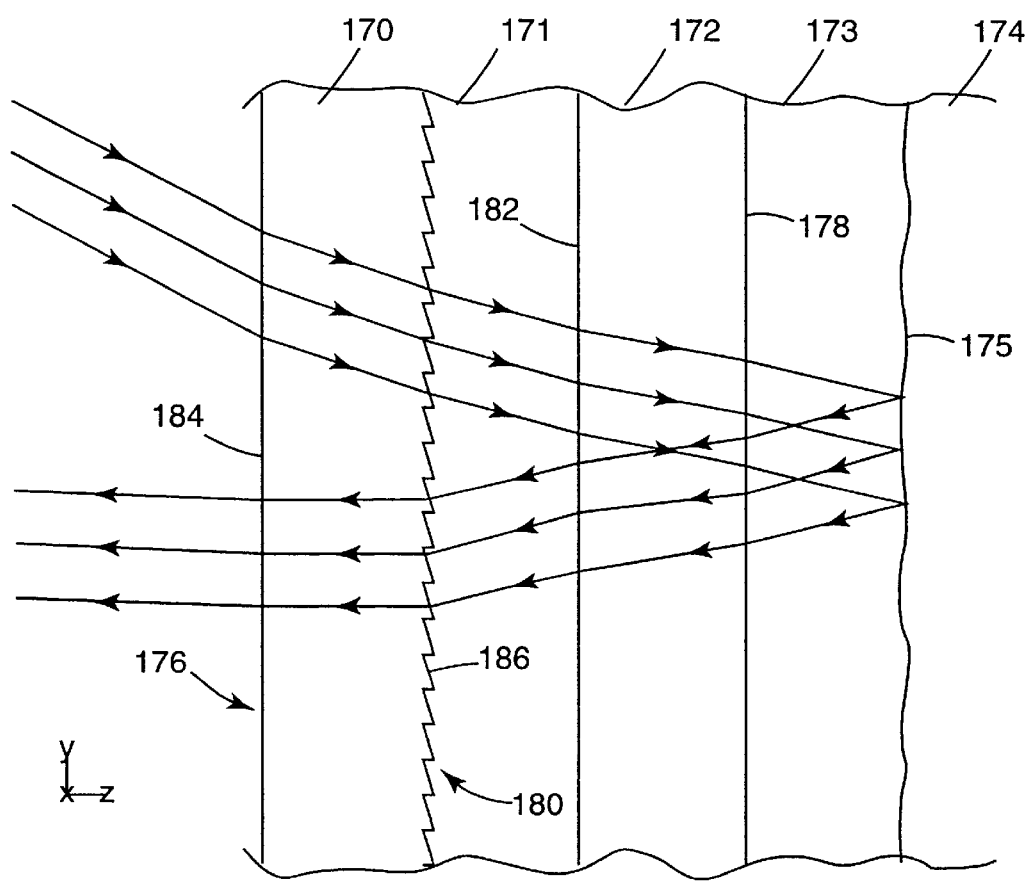
FIG. 16 is a vertical cross-sectional view of a controlled light distribution front projection screen in accordance with the present invention.
Figure 17:
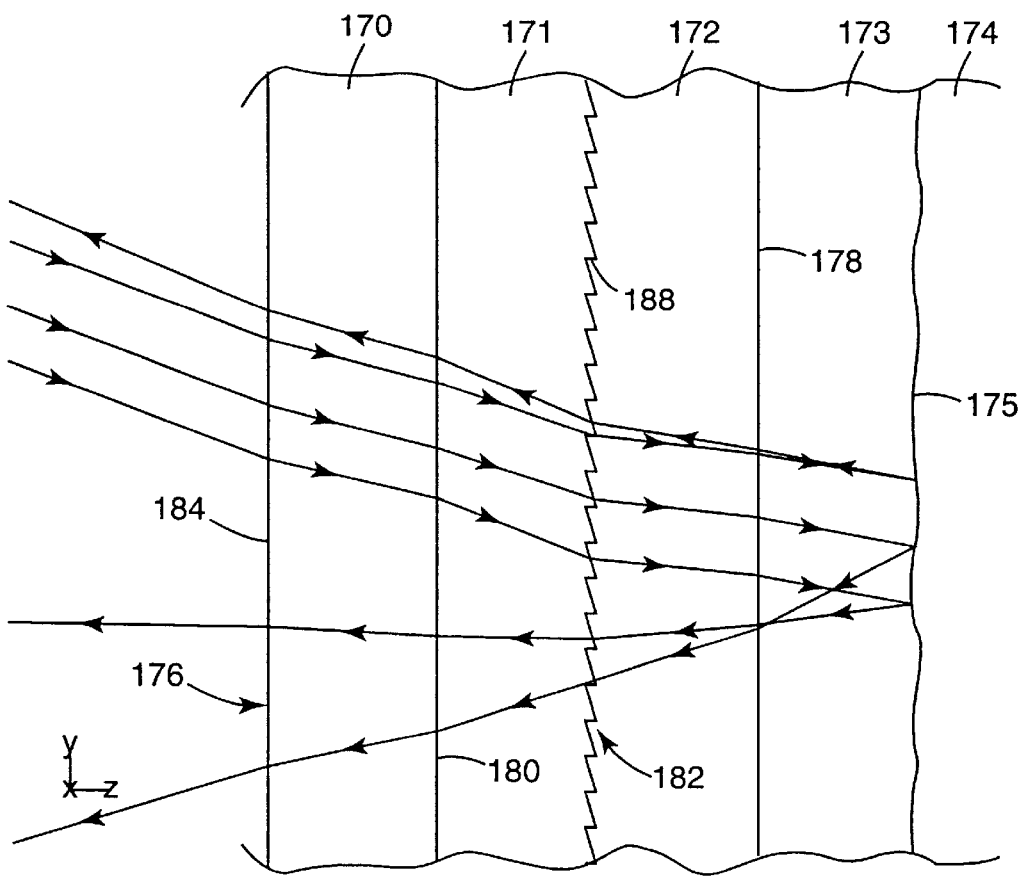
FIG. 17 is a horizontal cross-sectional view of the front projection screen illustrated in FIG. 16.

FIG. 16 illustrates an expanded view of a vertical cross-section of the projection screen 104. FIG. 17 illustrates an expanded plan view of a horizontal cross section of the screen. The projection screen comprises a multi-layer material. The screen 104 includes a first linear Fresnel lens element 170, a second linear Fresnel element 172, and a reflective component 174. First and second spacer elements 171 and 173 may be placed between the Fresnel elements 170 and 172 and between the second Fresnel element 172 and the reflective element 174 respectively. The linear Fresnel lens elements 170 and 172 include a planar side, 176 and 178 respectively, and a prismatic side, 180 and 182 respectively. The first Fresnel element 170 includes a thin isotropic diffusing layer 184 on its planar side 176. The diffusing layer 184 functions as an image-receiving surface. The prismatic side 180 includes a plurality of linear grooves 186 running horizontally in a graduated pattern. The grooves 186 are designed to control the vertical light spread. The lens center is positioned near the top of the projection screen.

The prismatic side 182 of the second linear Fresnel lens element 172 includes a plurality of vertical grooves 188 (FIG. 17) facing the plurality of grooves 186 of the first Fresnel lens element 170. The second linear Fresnel lens element 172 has a lens center positioned on a vertical line extending through the center of the screen. The planar surface 178 of second Fresnel element 172 faces a back reflector 174, having a vertical linear structure reflecting the light back in the direction of the audience. The grooves of the structured back reflector 174 preferably have a cylindrical shape, such as a lenticular structure, or may be a repeating groove pattern of micro facets that approximate a cylindrical shape. An incident surface 175 of the back reflector 174 may be specular or diffuse reflecting, metallic, or white coated, depending on the amount of screen gain and type of screen appearance desired. Second linear Fresnel element 172, in conjunction with the structured back reflector 174, provides control light distribution spreading in the horizontal direction to accommodate viewers who are positioned horizontally in front of the screen. Alternatively, the reflector structure 174 may be embossed into the planar surface 178, reducing the number of screen elements.

Alternative embodiments of the screen may comprise multi-layer film technology, for example as described in U.S. Pat. No. 6,018,419 (assigned to 3M).

Figure 5:
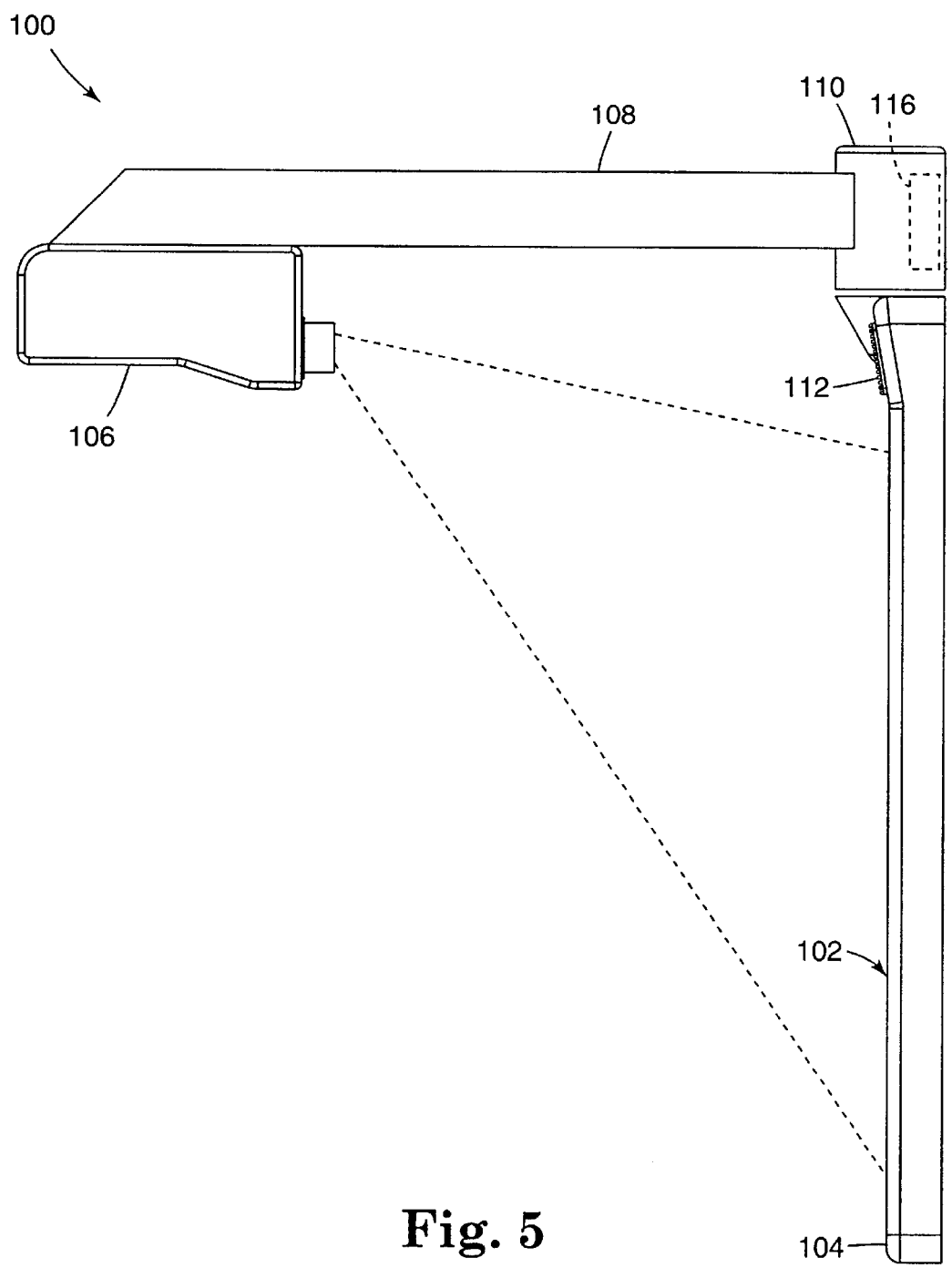
FIG. 5 is a side elevation view of the integrated front projection system illustrated in FIG. 3 in the use or projection position.

As may be appreciated in FIG. 5, the projection system 100 places the projection head 106 at an extreme angle and close distance to the screen 102, thus minimizing the possibility of the presenter's interference. Placement of the optical head 106 at the end of a radically offset projection arm 108 presented unique mechanical and optical challenges. Even the lightest and most compact conventional portable projectors at about 7 lb. (3.2 kg.), may have leveraged unbalanced strain upon the structure components. Optically, the throw distance necessary to even focus the image would have necessitated a long arm, further creating lever amplified stresses on the structure. Even if structurally sound, the system would have projected a severely keystone distorted and relatively small image.

An electronic optical engine includes imaging and electronic components. As better illustrated in FIG. 6, in projection system 100 the arm 108 is a rigid hollow structure. The structure of arm 108 defines an arm chamber 122 and allows for the modular and separate placement of a lamp control electronics module 118 and an imaging module 120. The lamp control electronics module 118 includes control boards, ballast, and other electronic components. The electronic elements are internally connected through an array of internal power and data connections. The imaging module 120 includes a light source, projection optics, color wheel and imager. By distributing components of the projection system along the arm and the frame, a lesser load is placed on the hinge and the arm. Also, a smaller projector head size becomes possible. Those skilled in the art will recognize that a variety of different modular arrangements may be possible within alternative embodiments of the present invention. For example, alternatively, components of the electronics module may be placed inside of frame 104.

Figure 18:
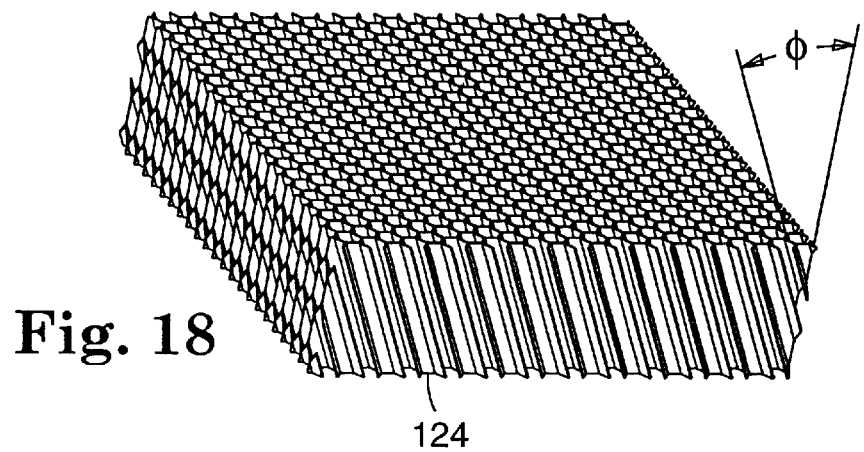
FIG. 18 is a perspective view of a portion of the honeycomb structure of the integrated front projection system illustrated in FIG. 3.
Figure 19:
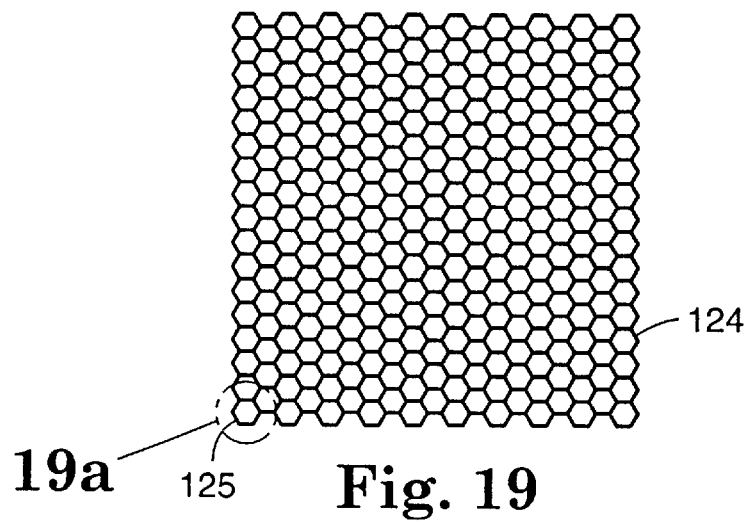
FIG. 19 is a detail plan view of the portion of the honeycomb structure illustrated in FIG. 18.
Figure 19A:
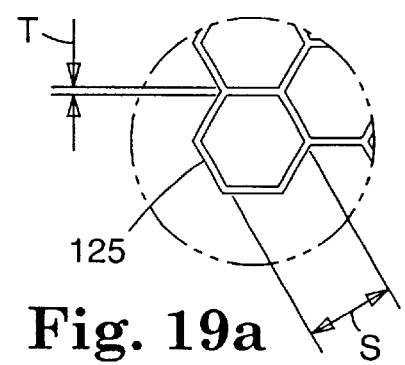

A considerable amount EMI/RFI shielding is required in traditional projector designs to reduce EM crosstalk between the lamp and the electronic components and to have radio frequency containment. The separate placement of electronic components 20 within the arm 108 naturally reduces EMI/RFI interference. Furthermore, in the exemplary system 100, the power supply and control electronics module 118 is enclosed by a honeycomb structure 124 including a plurality of hexagonal cells 125. The honeycomb structure surrounds the imaging module 120 and provides both EMI/RFI shielding and thermal management characteristics. FIGS. 18 and 19 illustrate details of the honeycomb structure 124. As described in U.S. Pat. No. 6,109,767, entitled, "Honeycomb Light and Heat Trap for Projector," assigned to 3M and hereby incorporated by reference, the shape, orientation, thickness and size of the hexagonal cells may be tuned to attenuate specific electromagnetic frequencies. In the present exemplary embodiment, the hexagonal cells 125 are aligned generally longitudinally along the arm 108 and are oriented at a predetermined specific angle $\phi$ to attenuate high electromagnetic frequencies. The honeycomb structure 124 is an aluminum hexagonal core having 0.25–0.0625 inch (0.635–0.159 cm.) cell size S, 0.002 inch (~0.005 cm.) foil thickness T, and a corrosion resistant coating. The physical separation of the electronic components and the honeycomb structure 124 provide sufficient attenuation to reduce the need for other traditional coatings or shields.

The present arrangement also offers an efficient thermal management system. An air intake 126 is located in the housing of the hinge unit 110. A fan 130, located in the projection head 106, draws air through the air intake 126, through the interior of the hollow projection arm 108, cooling the imaging module 120 located therein. The air exits the projection head 106 through an air outlet 129. Air also may be drawn through the projection head 106. The flow of cooling air also may be used to cool components located in the projector head 106 or a separate cooling air flow or heat management elements may be employed.

The orientation of the honeycomb structure 124 also is designed to act as a convection heat sink to absorb the thermal energy generated by the imaging module 120 and transfers the heat by convection into the flow of cooling air drawn by the fan 130. The honeycomb structure is oriented to direct airflow over sensitive components. Different portions of the honeycomb structure 124 may have different inclination angles to direct air flow to different components. The chamber 122 may also include exterior or interior fins, 127 and 128 respectively, to act as high efficient heat exchangers for both lamp and electronics cooling. The ability to direct the flow of cooling air with the honeycomb structure 124 into the interior fins 128 allows for better convection cooling, thus enabling the use of a low CFM fan 130 or even the use of naturally created convection. The cooling arrangement offered by the arm and the honeycomb structure also allows for very low overall power consumption and low audible noise.

Commercially available electronic front projectors are designed to project a specified screen diagonal (D) at a specified throw distance (TD). The throw ratio (TR) of a projector is defined as the ratio of throw distance to screen diagonal. Magnification is measured as screen diagonal/imager diagonal. Optically, the unobtrusive arrangement of the projection head 106 of projection system 100 requires that the image simultaneously accommodate three very demanding requirements: (1) short-throw distance, (2) high magnification, and (3) large keystone correction. To minimize image shadowing, in the present exemplary embodiment, the projector head 106 is located at a projection angle of about 15° and the arm measures about 30 in. (~76.2 cm). The screen 102 has a screen diagonal between 42 to 60 in. (~107–152 cm). Accordingly, the design goals for the exemplary display system 100 included (1) a throw distance $\leq 800$ mm; (2) a magnification >60×; and (3) image distortion correction for a projection angle of about 15°.

Figure 6:
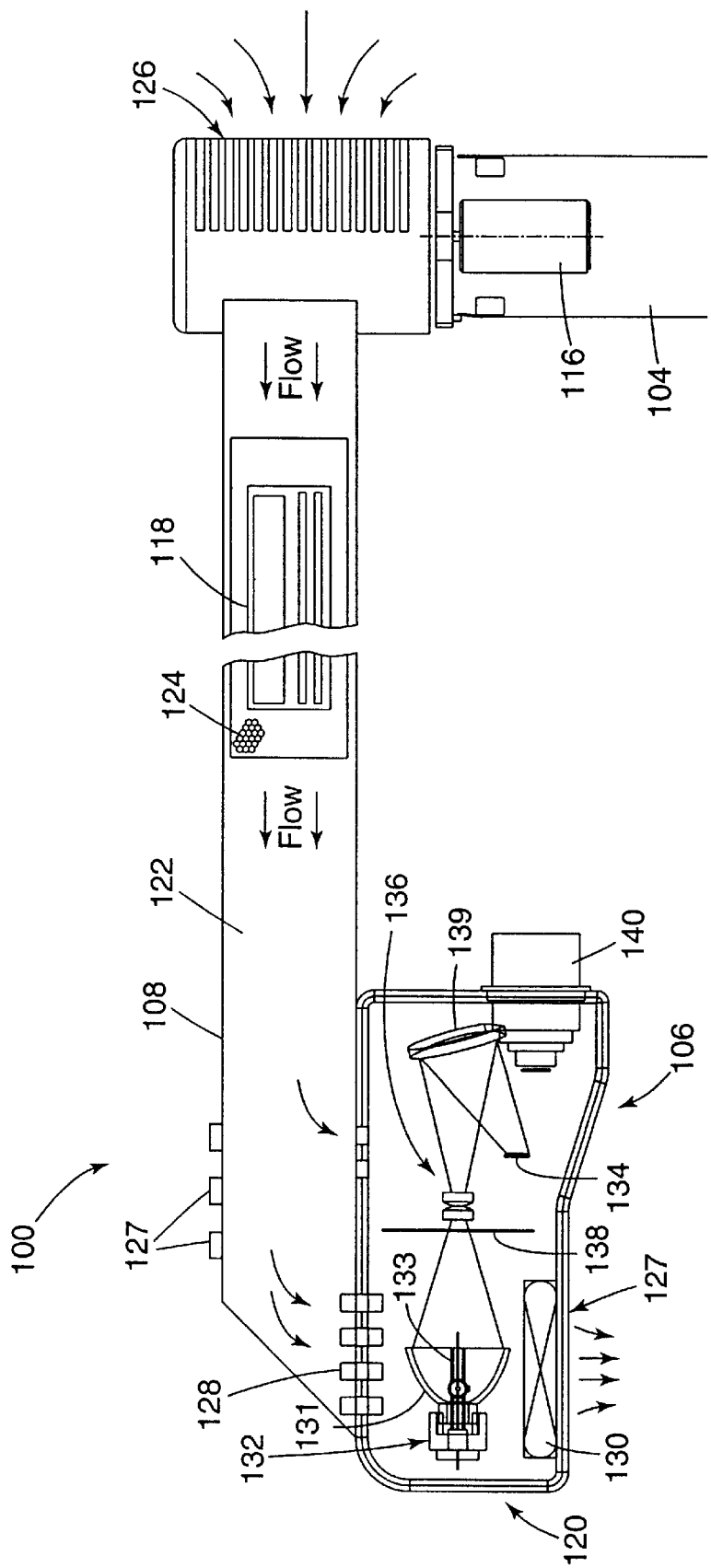
FIG. 6 is a schematic cut-away side elevation view of a first embodiment of the arm and projection head of the integrated front projection system illustrated in FIG. 3.

Referring to FIG. 6, the projection head 106 includes a lamp unit 132, an imager or light valve 134, condensing optics 136, a color wheel 138, a condensing mirror 139 and a projection lens 140. The projection head may also include polarization converters (for polarization rotating imagers), infrared and ultraviolet absorption or reflection filters, an alternative light source possibly coupled with a lamp changing mechanism, reflector mirrors, and other optical components (not shown). The lamp unit 132 includes a reflector 131 and a lamp 133. The reflector 131 focuses the light produced by the lamp 133 through the color wheel 138. The beam of light then is condensed by the condensing optics 136 and the condensing mirror 139. The now condensed beam of light is reflected off the condensing mirror and is directed towards the reflective imager 134, which in turn reflects the light onto the projection lenses 140.

The lamp unit 132 includes an elliptic reflector 131 and a high intensity arc discharge lamp 133, such as the Philips UHP type, from Philips, Eindhoven, The Netherlands, or the OSRAM VIP-270 from Osram, Berlin, Germany. Other suitable bulbs and lamp arrangements may be used, such as metal halide or tungsten halogen lamps.

In the present exemplary embodiment, the imager 134 includes a single XGA digital micromirror device (DMD) having about a 18 mm (≈0.7 in) diagonal, such as those manufactured by Texas Instruments, Inc., Dallas, Tex. The color wheel 138 is a spinning red/green/blue (RGB) color sequential disc producing 16.7 million colors in the projected image. In alternative embodiments, the color wheel and the imager 134 may be replaced by different suitable configurations, such as a liquid crystal RGB color sequential shutter and a reflective or transmissive liquid crystal display (LCD) imager. Those skilled in the art will readily recognize that other optical components and arrangements may be possible in accordance with the spirit of the present invention.

The imager 134 and the lamp 132 may be cooled by the airflow generated by the fan 130. A further thermal advantage of the arrangement of the present embodiment is that the warmer components, such as the lamp, are located at an end portion of the cooling air flow path, thus preventing the intense heat from the lamp from affecting delicate electronic components.

To provide 15° keystone correction, the light valve center may be shifted from the projection lens center by an amount equal to the projection angle. Full keystone correction by this optical means requires a more complex projection lens design, e.g., a large full-field coverage angle may be required. The keystone correction features need not be limited only to the optics. Partial keystone correcting optics, electronic keystone correction means, and screen inclination may be combined to achieve a non-distorted image. In an alternative embodiment, the screen may be motor driven, to reach an inclined projection position at the time that the arm is placed in the open position.

Figure 20A:
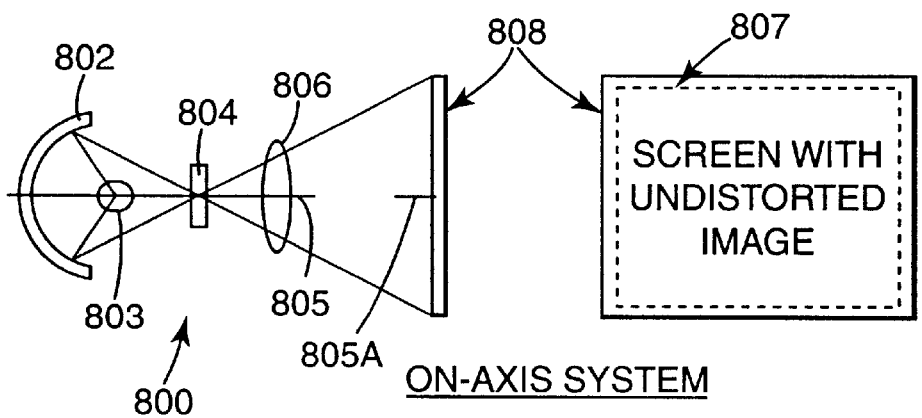
FIGS. 20A, 20B and 20C are cross-section views of example optical systems characterized by being on-axis, extreme off-axis, and extreme off-axis with correction.
Figure 20B:
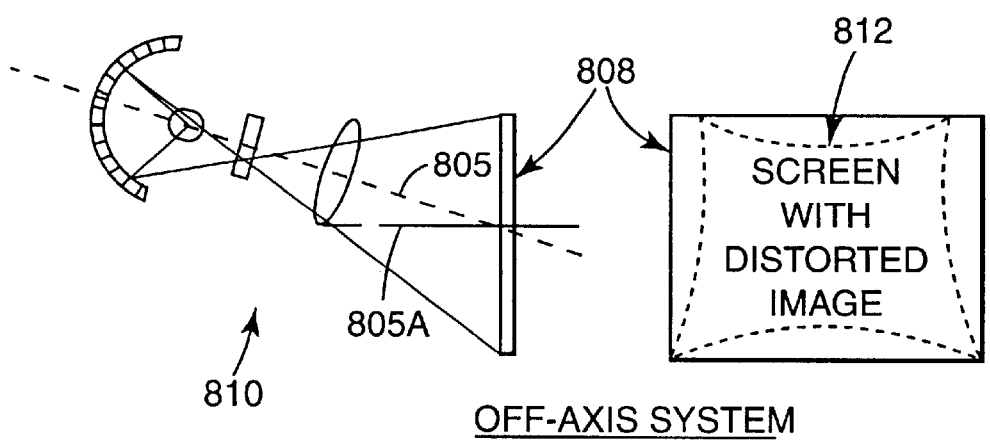
Figure 20C:
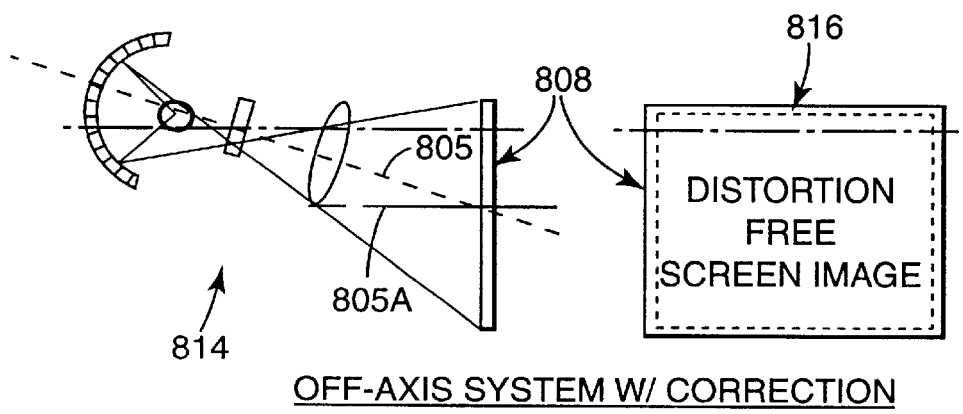

With regard to correcting distortion, FIGS. 20A, 20B and 20C are cross-section views of example optical systems characterized by being on-axis, off-axis, and off-axis with correction. As shown in FIG. 20A, an on-axis optical system, indicated generally at 800, may include a lamp/reflector 802, an image source 803, an imager 804, and a projection lens 806. Together, these components of optical system 800 operate to project an image 807 onto a screen 808 along a projection axis 805. 805A is a screen axis normal to the screen center. Optical system 800 is "on-axis" in that the projection optics axis 805 (including the lamp/reflector 802, the imager 804 and the projection lens) and the screen axis 805A are in alignment. As an on-axis system, optical system 800 produces an image on screen 808 that is relatively free from distortion.

Figure 21:
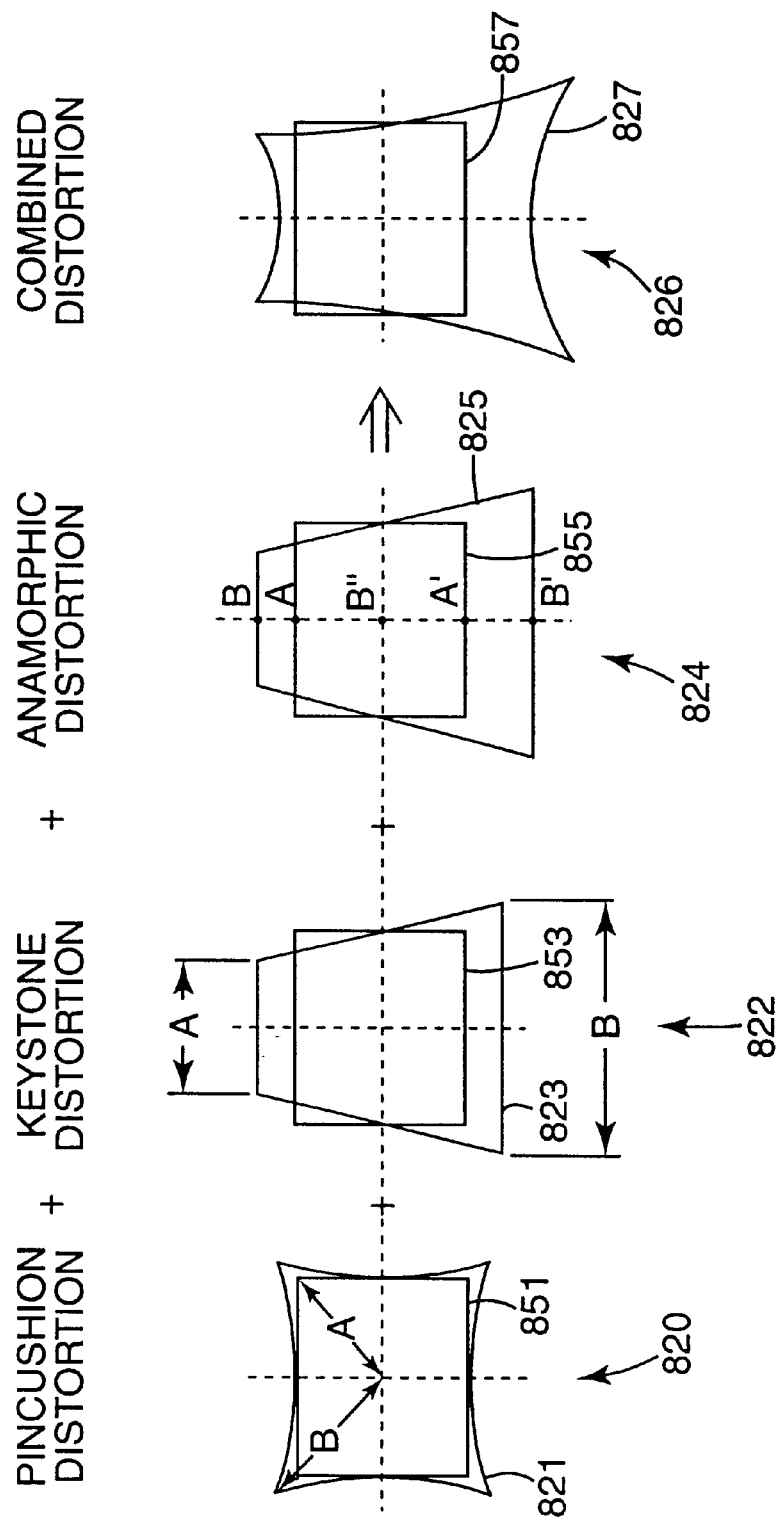
FIG. 21 is a plan view illustrating distortion that can occur in an uncorrected short-throw, extreme off-axis projection system like the present integrated front projection system.

In contrast, FIG. 20B shows an optical system, indicated generally at 810, in which the components are in an off-axis configuration like the integrated front projection systems described herein. As shown, the optical axis 805 for the lamp/reflector 802 is now not aligned with the screen axis 805A. In other words, the image is being projected downward at a sharp angle. Thus, optical system 810 is referred to as "off-axis" in that the projection optics and the projection screen normal are not on a common axis and the projection lens 806 is positioned relatively far from the axis. In this off-axis case of optical system 810, an uncorrected image 812 projected onto a screen 808 will be distorted, as shown, due to the extreme off-axis alignment, and other optical aberrations, such as lens pincushion distortion. FIG. 21 and the associated text below describe in more detail the distortion components that may be generated in such an off-axis system.

FIG. 20C illustrates an off-axis optical system, indicated generally at 814, with correction for distortion. As shown, when distortion is corrected in accordance with the preset invention, a corrected image 816 projected onto a screen 808 may appear relatively distortion free as with the image projected by on-axis optical system 800.

FIG. 21 is a plan view illustrating distortion components that may be generated in an uncorrected short-throw, extreme off-axis projection system like the present integrated front projection system. This distortion is relatively unique as a result of the distance from the projector to the screen being short and the optical system being off-axis. As shown in FIG. 21, the short-throw, off-axis optics may produce a pincushion distortion component 820, a keystone distortion component 822 and an anamorphic distortion component 824 which together produced a combined distortion 826. Consequently, the creation of a rectilinear distortion free projected image would involve the correction by electronic and optical means of these three component types of distortion in accordance with the present invention.

Pincushion distortion component 820 is a third order distortion generated by the projection lens. This is a consequence of the high magnification, short throw distance requirements, and the desire to reduce the lens size and cost. With respect to component 820, the box 851 represents a desired undistorted image that may be projected, for example, with an ideal on-axis projection system. The segment A represents the undistorted distance from the center of the image to the corner of the image box 851. The distorted box 821 represents the pincushion distortion of this ideal image. The segment B represents the distance from the center of the image to the distorted corner of distorted image box 821. The pincushion distortion component 820 can be expressed as a distortion percentage defined as:

$$\text{Distortion } [\%] = [(B-A)/A]*100$$

using the variables shown in FIG. 21. In one embodiment of the present integrated front projection system, the lens used is a 9.44 mm focal length, 53.2 mm clear aperture projection lens manufactured by Zeiss GmbH of Jena, Germany, which allows 10.4% pincushion distortion, or approximately 10%, in the design of the lens.

Keystone distortion component 822 (vertical distortion) occurs because the optical system is projecting, for example, off-axis 15° from the horizontal. Consequently, the distorted projected image would be wider at the bottom than the top. With respect to component 822, the box 853 represents a desired undistorted image that may be projected, for example, with an ideal on-axis projection system. The distorted box 823 represents the keystone distortion of this ideal image. Segment A represents the top width of the image, and segment B represents the bottom width of the image. From FIG. 21, this distortion can be expressed as a percentage defined as:

$$\text{Distortion } [\%] = [(B-A)/A]*100$$

For example, the calculated keystone distortion for one embodiment of the present front projection system is 73.9%, or approximately 74%.

Because projection is being performed off-axis, anamorphic distortion component 824 occurs simultaneously with keystone distortion component 822. As shown, anamorphic distortion 824 causes the uncorrected image to be stretched in the vertical direction relative to the horizontal direction. With respect to component 824, the box 855 represents a desired undistorted image that may be projected, for example, with an ideal on-axis projection system. The distorted box 825 represents the anamorphic distortion of this ideal image. Points A and A' represent the top and bottom edges of image 855 at the center of the image. Points B and B' represent the top and bottom edges of the distorted image 825 along the center of the image, and point B" represent the middle point of the distorted image. From FIG. 21, this distortion can be expressed as a percentage defined as:

$$\text{Distortion } [\%] = [(x \tan(\alpha-\theta) + x \tan(\alpha+\theta) - 2x \sec(\theta)\tan(\alpha)/2x \sec(\theta)\tan(\alpha)]*100$$

For example, the calculated anamorphic distortion for one embodiment of the present front projection system is 33.5%, or approximately 34%.

Figure 22:
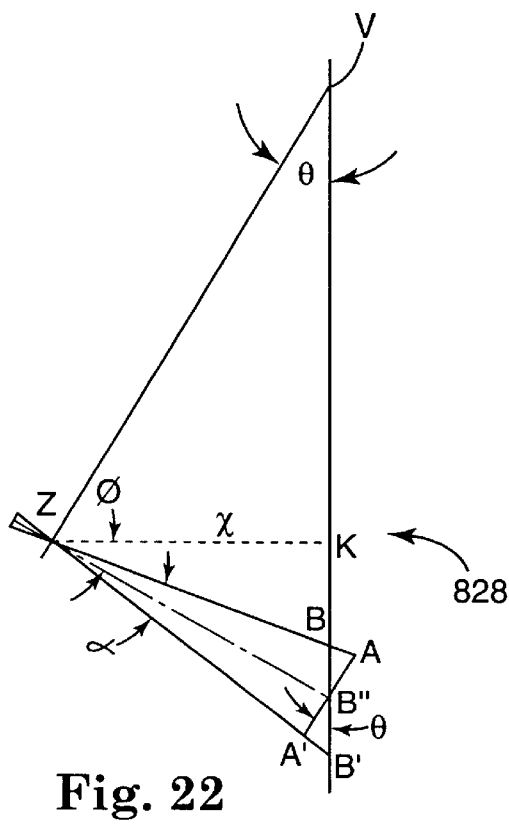
FIG. 22 is a plan view of tilted projection on a vertical screen.

With regard to the above equation for anamorphic distortion, FIG. 22 is a plan view of tilted projection 828 on a vertical screen that defines the variables used in that equation. The illustration of FIG. 22 is taken from a reference: Rudolph Kingslake, "Optical System Design," Academic Press, 1983, pp. 269–272, which is incorporated herein by reference.

Referring in more detail to FIG. 22, the segment from Z to B" represents the projection axis, where B" is the point at which the image axis crosses the screen. The screen is represented by the segment going through points V and K, and on which points B", B and B' also lie. The distance "x" represents the perpendicular distance from the screen at point K to the point Z, which represents the projection point on the projection axis. Segment A to A' represents the image plane that passes through point B". The angle "θ" represents the angle between the image plane and the screen. The distance "x sec(θ)" represents the distance from the point Z to the point B". The angle "α" represents the angle between the segment Z to B" and the segment Z to A and the segment Z to A'. The point B represents the point at which the segment Z to A passes through the screen. The point B' represents the point at which the segment Z to A' passes through the screen. As shown in FIG. 21, the segment B to B" and the segment B' to B" follow the equations below.

$$BB'' = AB''[\cos(\alpha)/\cos(\theta - \alpha)]$$

$$B'B'' = A'B''[\cos(\alpha)/\cos(\theta + \alpha)]$$

In summary, as stated above, FIG. 22 provides the geometric variables for the equations discussed with respect to the anamorphic distortion 824 in FIG. 21.

Referring back to FIG. 21, as shown, the result of distortion components 820, 822 and 824 is combined image distortion 826. For this overall distortion 826, the box 857 represents a desired undistorted image that may be projected, for example, with an ideal on-axis projection system. The distorted box 827 represents combination of the pincushion distortion component 820, the keystone distortion component 822 and the anamorphic distortion component 824.

To correct for these distortion components, a combination of optical and imager shaping distortion correction may preferably be used, and this combination solution compensates for the distortion components shown in FIG. 21.

Figure 23:
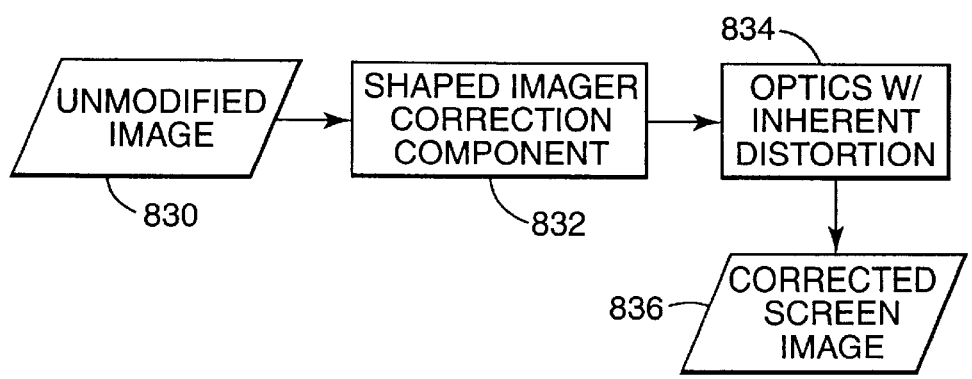
FIG. 23 is a block diagram of one embodiment of a front projection system having a distortion correcting shaped imager according to the present invention.

FIG. 23 is a block diagram view of one embodiment of combining imager shaping and optical correction of distortion in accordance with the present invention to accomplish a rectilinear distortion free image. As shown in FIG. 23, an unmodified image 830 is corrected by a shaped imager correction component 832 which functions to pre-distort image 830 appropriately for distortion that will be normally introduced by the projection system. The pre-distorted image is then projected through optics 834 having inherent distortion characteristics to produce a corrected screen image 836. The inherent distortion characteristic of optics 836 can theoretically range from no distortion to very large distortion, thus optics 836 could also be considered to have a corrective component ranging from full correction to limited correction.

Unlike the distortion correcting imager of the present invention, conventional electronic imagers are typically sized to match the resolution of the image to be projected. For example, an XGA imager, such as the XGA digital micro-mirror device (DMD) described above, might be sized to a specific rectangular shape of 1024 horizontal and 768 vertical pixels.

Figure 24:
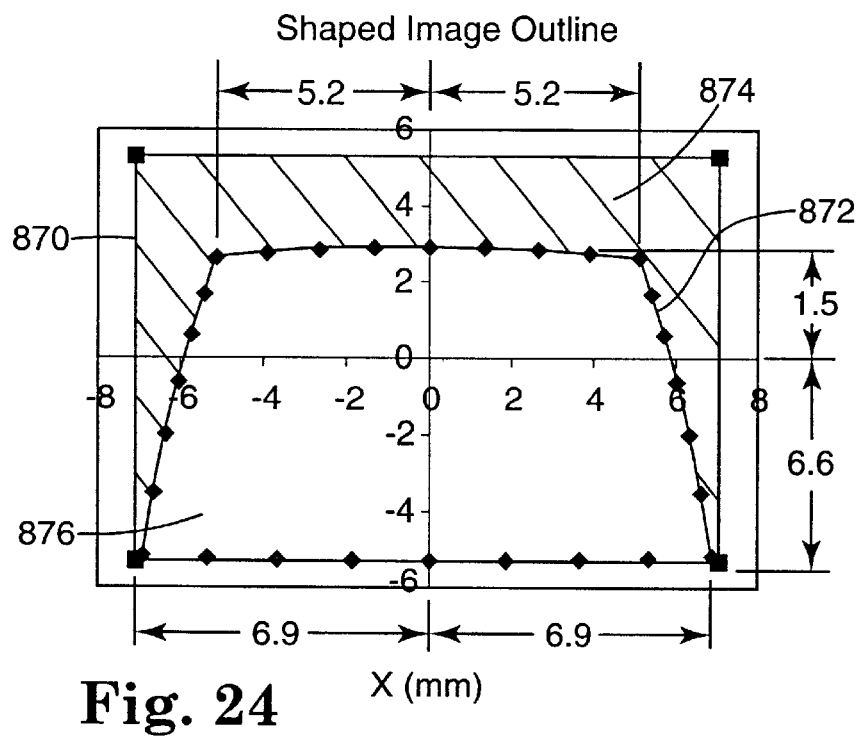
FIG. 24 is a plan view of the geometry of one embodiment of a distortion correcting imager according to the present invention.

In contrast, the distortion correcting imager according to the present invention is reshaped from the conventional geometry to produce a pre-distorted image 876, as depicted in FIG. 24, that compensates for distortion inherent in projection system. For example, such inherent distortion may be introduced by the projection optics within a project system. In this embodiment, shaped imager correction component 832 is shaped to pre-distort image 830 so that the distortion introduced by projection optics, such as optics 834, actually returns the image to the desired, undistorted shape. Consequently, when pre-distorted image 830 is projected by projection optics 834, the result is a corrected screen image 836.

FIG. 24 is a plan view of the geometry associated with one embodiment of shaped imager correction component 832 according to the present invention. In FIG. 24, the units of the X and Y axes are millimeters (mm). The rectilinear area 870 represents, as a reference, the geometry of a conventional unshaped imager such as the XGA digital micro-mirror device (DMD) described above. This geometry for active area 870 is, for example in the embodiment shown, 14.12 mm by 10.59 mm (7.06 mm+7.06 mm for the top and bottom edges, and 5.295 mm+5.295 mm for the left and right edges).

In FIG. 24, the outline 872 represents how an image boundary would be shaped to compensate, for example, for keystone and other optical distortions. Thus, when projected, the image 836 would be projected as a non-distorted rectilinear image. This pre-distortion may be accomplished by electronic digital warping means, for example, by mapping the full pixel range for a rectangular imager 870, with regularly spaced pixels, into the pre-distorted outline 872. Such a digital image warping technique is described in U.S. Pat. No. 5,594,676, assigned to Genesis Microchip Inc, which is incorporated herein by reference. However, image information will be lost through the mapping and extrapolation process. This is so because, for example, in the top row, an image that is nominally 14.12 mm wide will be compressed into an image that is 10.248 mm wide. If the pixel density of the imager is not adjusted, the portion 876 within outline 872 will include fewer pixels than the whole imager size 870, and yet be trying to convey the same image information. Thus, image information will be lost. Pixels within portion 874, which is not used after re-mapping into portion 872, will simply be dark and unused to provide image projection. This portion 874, therefore, represents wasted imager space.

As contemplated by the present invention, the imager itself may be modified to match the desired shape of the pre-distorted image. Thus, outline 872 also represents the shape for a shaped imager correction component 832 that is shaped to compensate for a certain amount of keystone and optical distortion. As such, rather than being rectangular, for example, the nominal image shape 872 of this embodiment of imager 832 has a curved bottom edge with a width of approximately 13.798 mm (6.899 mm+6.899 mm), a curved top edge with a width of approximately 10.428 mm (5.124 mm+5.124 mm), and curved sides extending from the bottom to the top. Also, as shown, the image center correlates to a position approximately 5.163 mm from the bottom imager 872, and the overall height of imager 872 is approximately 8.065 mm (2.902 mm+5.163 mm). In particular, the FIG. 24 embodiment of shaped imager correction component 832 would be appropriate for use in an optical application with a short throw, high tilt angle such as that described herein.

The exact shape of an imager necessary to produce a rectilinear image on the projection screen may be calculated using a three-dimensional ray trace that models the optical system as a point at the lens exit pupil, or alternatively, by an actual ray trace through the system. This includes a mathematical description of the effects of lens pincushion distortion, keystone distortion, and anamorphic distortion. Utilizing this modeled or actual ray trace and associated mathematical description, the physical configuration for the shaped imager can be selected and determined so that the input image to the projection system is pre-distorted in such a way as to compensate for distortion effects, such as pincushion, keystone and anamorphic distortion. For example, to account for only keystone distortion effects, a simple trapezoid shape could be utilized. However, to account for more complicated distortion effects, a physical configuration that includes curved top, bottom and sides would be utilized, such the physical configuration discussed with respect to FIG. 24.

Figure 25A:
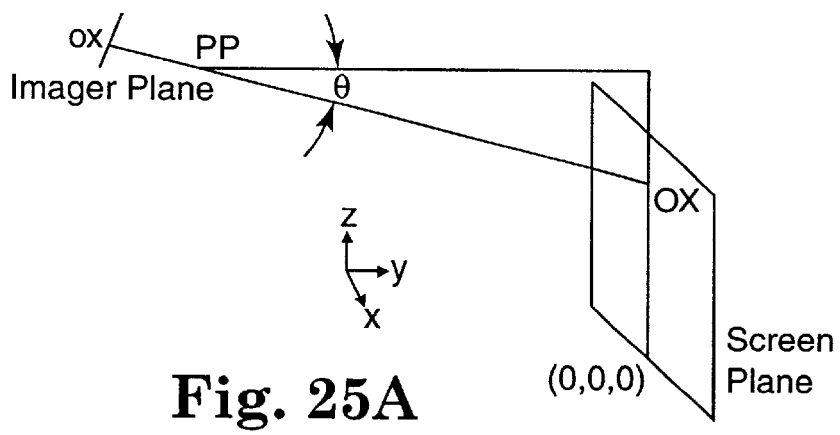
FIGS. 25A and 25B are diagrams of the system parameters used in the calculation of the imager shape.
Figure 25B:
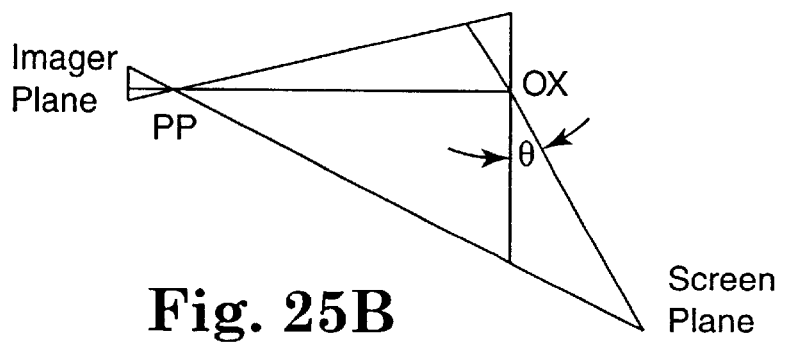

FIGS. 25A and 25B depict projector system parameters that may be used for the calculation of the imager shape. The projection screen, for example, may be vertical and have dimensions of 922.4 mm high by 1227.2 mm wide. The projection lens exit pupil may be 782 mm from the screen plane and 74.5 mm above the top of the screen. And the projection lens axis points downward 150 from the horizontal. The projection optical axis may be displaced 3.7 mm from the optical center of the imager for optical correction of ≈52% of the total keystone distortion. The locations of the pupil point (PP) and the intersection point of the optical axis with the screen plane (OX) are marked on FIGS. 25A and 25B. For this exemplary system, PP may be defined by the coordinates x=0, y=−782, z=997.2, and OX may be defined by the coordinates x=0, y=0, z=787.6.

The calculated shape of the imager accounts for the residual keystone and anamorphic distortion generated by the 15° downward projection axis, and ≈10.4% projection lens pincushion distortion. To calculate the location of the shaped imager edge points, an array of projected image edge points is defined for the desired projected image size in the screen plane shown in FIG. 25A. Some examples of points in the defined 3-dimensional coordinate space would be x=−613.6, y=0, z=922.4; x=613.6, y=0, z=922.4; x=613.6, y=0, z=0; x=−613.6, y=0, z=0. These four points four corners of the projected image on the screen plane, with additional edge points defined by varying "x" from −613.6 to 613.6 and "z" from 0 to 922.4 to form an array of edge points.

A series of line unit vectors from each point on the projected image edge passing through the pupil point PP is then defined as EP0. Additionally, a plane is defined which contains the point OX and is parallel to the plane of the shaped imager as in FIG. 25B. If the same optical system were to project an image on this plane, the image would have no keystone or anamorphic distortion as the projection angle would be 0 degrees. In this plane, the intersection of the projected edge point line unit vectors EP0 is calculated for each edge point. These points can be described by the equation:

$$EP1 = PP + \frac{L2}{EP0*OA} * OA,$$

where PP is the location of the pupil point, L2 is the distance from point PP to point OX, EP0 is the array of vectors defining the location of the actual projected image edge points in the screen plane, and OA is the optical axis unit vector.

Staying in the plane parallel to the shaped imager plane and through the point OX, the effect of optical distortion can be considered by defining a set of points in this plane that would represent an image with 0% optical distortion and comparing them to the points defined by EP1. These point can be described by the equation:

$$ep2 \; ep1*d,$$

where ep2 is the distance from OX to each undistorted point in this plane, ep1 is the distance from OX to each distorted point in this plane defined by EP1, and d is a measure of the system distortion, for this system 0.104 or 10.4%. An array of vectors defining the locations of each point ep2 can be defined as EP2, and an array of line unit vectors from A complex optical system may be modeled as a pinhole at the exit pupil. In such a model, the object and image points are located along a straight line through the pupil point.

Since the effects of keystone, anamorphic distortion, and optical distortion have been accounted for in calculating V2, the final shaped imager edge point locations can be PP intersects the shaped imager plane. These points can be defined in the 3-dimensional coordinate space of this transform as $$V1 = PP - \frac{L1}{V2*OA} * OA,$$

Where PP is the pupil point, L1 is the distance from PP to the shaped imager plane along the optical axis, V2 is the array of line unit vectors from point EP2 through PP, and OA is the optical axis unit vector. V1 gives the x, y, and z coordinates of the edge points of the shaped imager in the 3-dimensional coordinate space of this transform.

To plot the outline of the shaped imager in the 2-dimensional plane of the shaped imager, the points defined by V1 are translated to the origin of the 3-dimensional transform space and rotated 15 degrees about the x axis to give $$XZ = \begin{pmatrix} 1 & 0 & 0 \\ 0 & \cos 15° & -\sin 15° \\ 0 & \sin 15° & \cos 15° \end{pmatrix} * V0,$$

where V0 is the distance form the points defined by V1 to the point where the optical axis intersects the shaped imager plane. XZ is then an array of points in 3-dimensional space which all have y=0, and the x and z coordinates represent the location of the shaped imager edge point coordinates in the plane of the imager, with the point x=0, z=0 defined as the point at which the optical axis intersects the plane.

The resultant calculated shape of the imager to produce a rectilinear image on the projection screen, given the expected lens distortion, and the keystone and anamorphic distortion generated by the off-axis projection, corresponds to 872 as shown on FIG. 24. For a system magnification of 88.3×, the shaped imager has a bottom width of approximately 13.8 mm and a top width of approximately 10.4 mm. Also, the imager center correlates to a position approximately 5.2 mm from the center of the lower boundary, and the overall height of imager 872 is approximately 8.1 mm. The outward curvature of the imager boundary is opposite to the inward curving boundary of a projected image with pincushion distortion.

In shaping the imager, it may be understood that an imager may be, for example, made up of a plurality of rows of elements that produce or represent image pixels. This plurality of rows of pixels may be arranged with an equal number of pixels in each row. Thus, the image information per row is the same. In constructing the geometry of the shaped imager, the spacing between the pixels in each row may be modified so that a desired imager shape is achieved. For example, looking to FIG. 24, the pixels in the top rows of portion 876 may be closer together than the pixels in the bottom rows of the portion 876. In this way, the spacing between pixels in any given row may be different from the spacing between pixels in a different row. The resulting shaped imager may produce a shaped image with equal pixel information per row, preserving the input resolution. It is noted that other element or pixel density and/or arrangements may be utilized, as desired, to achieve the shaped imager of the present invention. It is also understood by those skilled in the art, that this variable pixel spacing shaped imager geometry can be applied to various types of imagers, e.g. transmissive or reflective LCD imagers, or DMD reflective imagers.

With the use of a shaped imager 832 to pre-distort the projected image, the illumination system may be designed to concentrate all of the light into a unique beam which matches the geometry of imager 832. The image is then focused onto the projection lens and then projected onto a screen. By virtue of its shape, imager 832 may thus provide a rectilinear, corrected screen image 836 without the need for electronic scaling.

Further, with regard to image resolution, imager 832 may be constructed such that full image resolution is achieved. For example, in the case of a DMD device, the individual mirror elements may be sized such that there are the same number of elements carry with it full image information without degradation. In other words, the shaping of the distortion correcting imager 832 allows the optical system to be coupled to the imager shaped to help achieve the true resolution requirements (i.e., XGA, SXGA, HDTV, etc.) of the projection system. The ability to project a fully processed image front projection system without the need for extreme electronic re-scaling is advantageous and unique.

Figure 7:
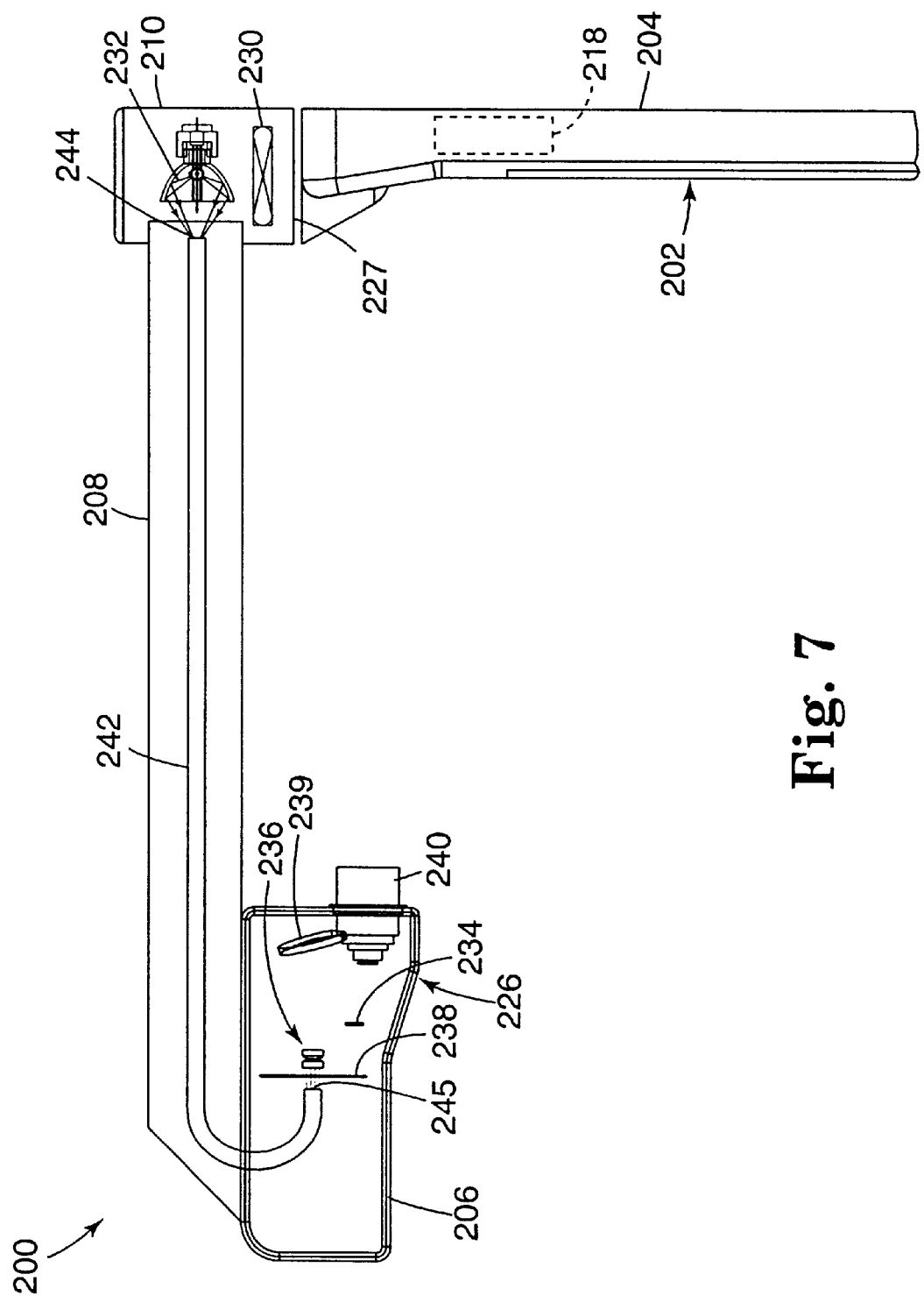
FIG. 7 is a schematic cut-away side elevation view of a second embodiment of the arm and projection head of the integrated front projection system illustrated in FIG. 3.

FIG. 7 illustrates another exemplary embodiment 200 of the present invention. This embodiment 200 is similar in some respects to the embodiment 100 depicted in FIG. 6. With respect to FIGS. 6 and 7, the same last two digits in the reference numerals designate similar elements in all exemplary embodiments. To decrease the size of the light engine even further and to reduce the size and weight of projector head 206 and arm 208, lamp 232 and fan 230 may be placed within hinge unit 210 or within frame 204.

Power supply and electronic components 218 may be located inside frame 204 and behind screen 202. A sequential color wheel 238, a projection lens 240, and condensing optics 236, including a condensing mirror 239, may remain within the projector head 206. A flexible illumination waveguide 242 may be channeled through the projection arm 208 and couples the illumination from the lamp or light source 232 to the condensing optics 236.

The lamp 232 focuses light into an entrance aperture 246 of the illumination waveguide 242. The light may be transmitted by the illumination waveguide 242 up to an exit aperture 245, where the light may be then directed through the color wheel 138 to the condensing optics 236 and 239. In the present embodiment, the illumination waveguide 242 may be a solid large core plastic optical fiber, such as Spotlight type LF90FB from Sumitomo 3M Company, Ltd., Japan, or Stay-Flex type SEL 400 from Lumenyte International Corp., of Irvine, Calif.

Cooling in system 200 may be performed in a reverse direction than in system 100. The cooling mechanism or fan 230 draws air from the air intake 226 located in the projection head 206 and exhausts air through the air exhaust 227 located on the hinge unit 210.

Figure 8:
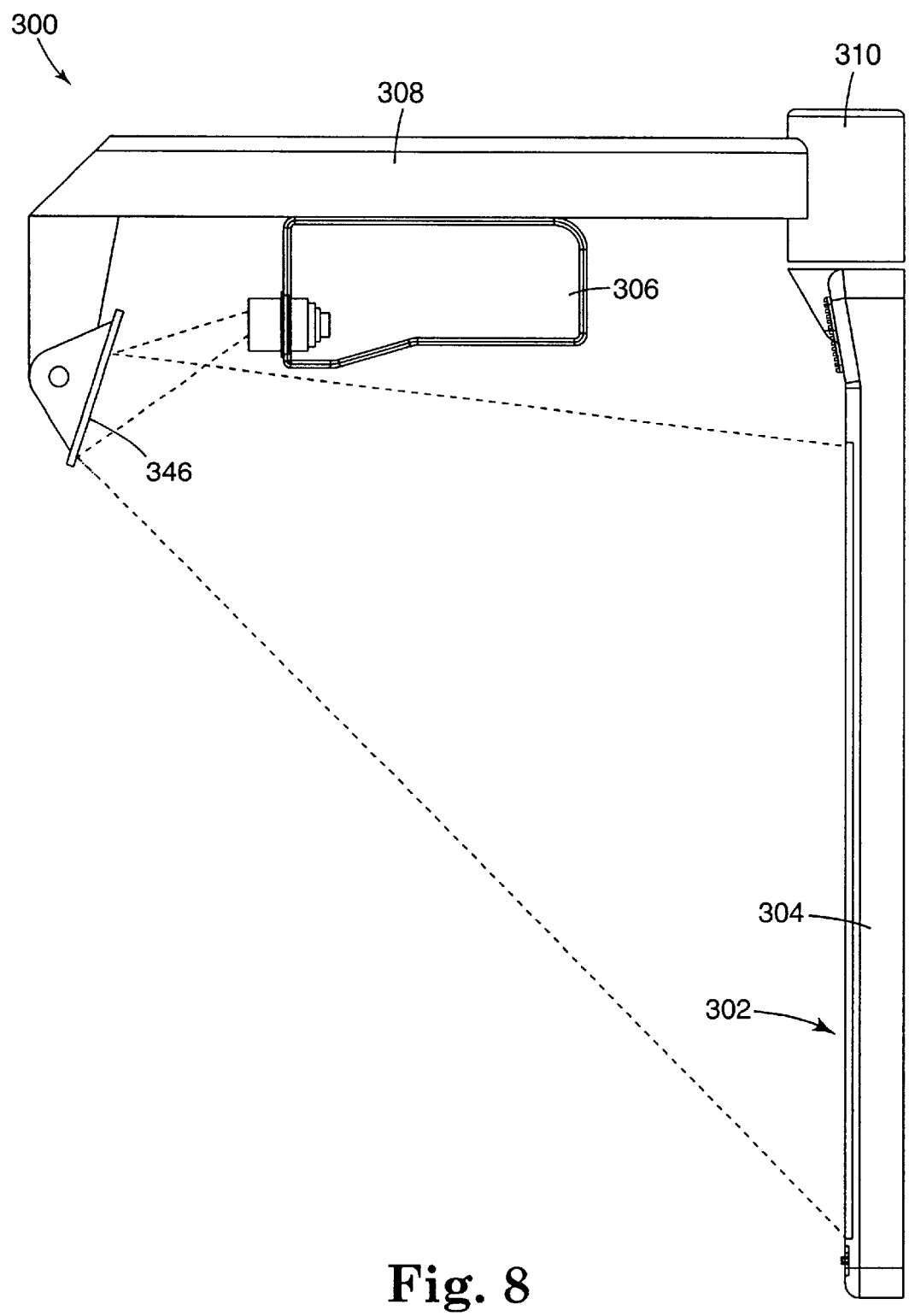
FIG. 8 is a side elevation view of a third embodiment of an integrated front projection system in accordance with the present invention in the use or projection position.

FIG. 8 illustrates a third exemplary embodiment of a projection system 300 in accordance with the present invention. The projection system 300 includes a projection head 306 mounted along the mid-span of a pivoting arm 308. The projection head 306 is is substantially similar to the projection head 106 in system 100. The image projected by a projection lens 340 of the projection head 306 may be reflected off a mirror or reflective surface 346 onto a screen 302. The arrangement of optical system 300 allows for an increased throw distance and magnification while maintaining the same arm length or for the same throw distance and magnification with a shorter pivoting arm.

Figure 9:
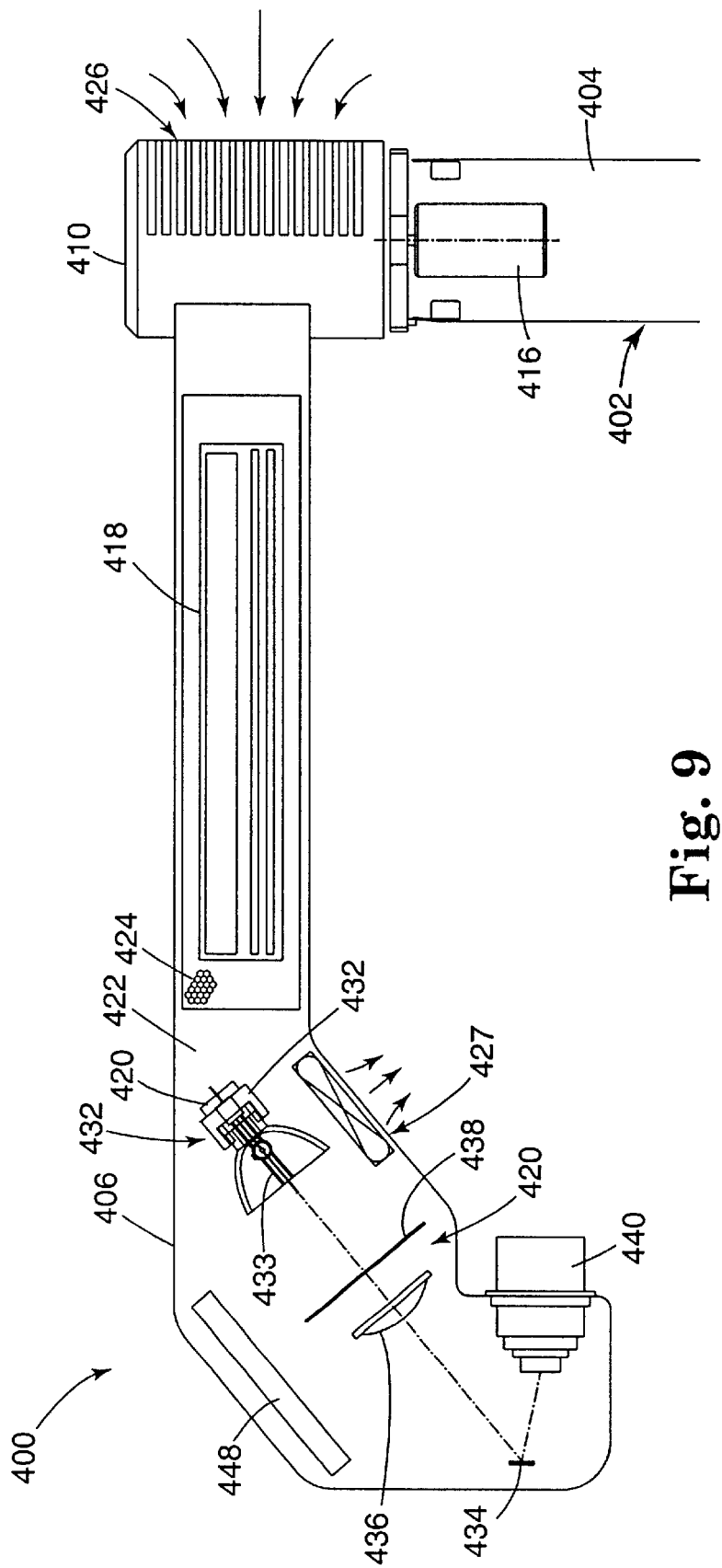
FIG. 9 is a schematic cut-away side elevation view of a fourth embodiment of the arm and projection head of an integrated front projection system in accordance with the present invention.

FIG. 9 illustrates a fourth exemplary embodiment of a projection system 400 in accordance with the present invention, having a screen 402, a frame 404, a projection head 406, and an arm 408. The projection head 406 of the projection system 400 includes a lamp 432 optically aligned with a transmissive color wheel 438 and condensing optics 436. After passing through the color wheel 438 and the condensing optics 436, a light beam is focused upon a reflective imager 434, which, in turn, directs the light beam towards a retrofocus projection lens 440. The projector system 400 includes modular power supply and system electronics 418 and a separate modular driver board 448 for the imager 434.

Figure 10:
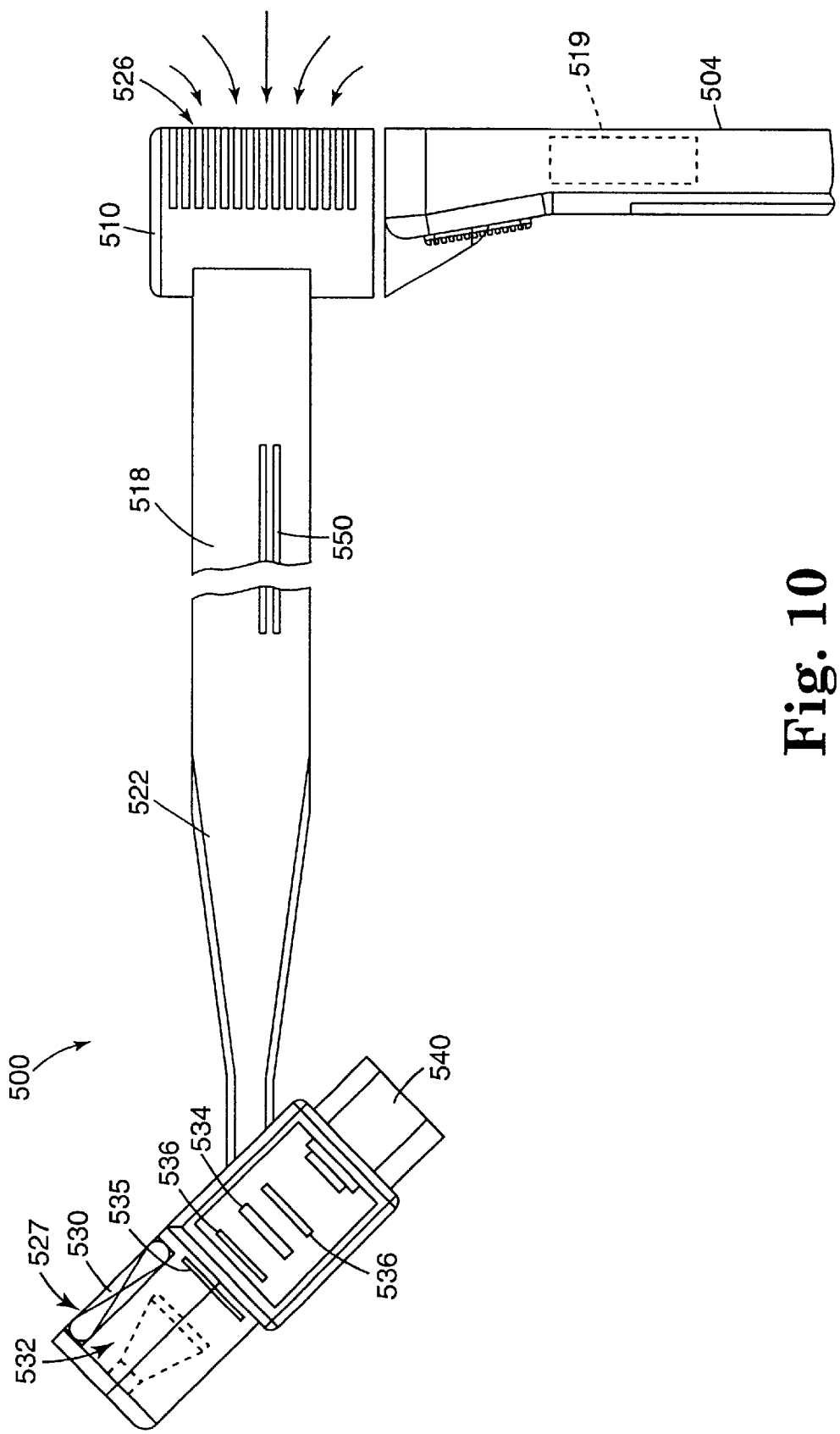
FIG. 10 is a schematic cut-away side elevation view of a fifth embodiment of the arm and projection head of an integrated front projection system in accordance with the present invention.
Figure 11:
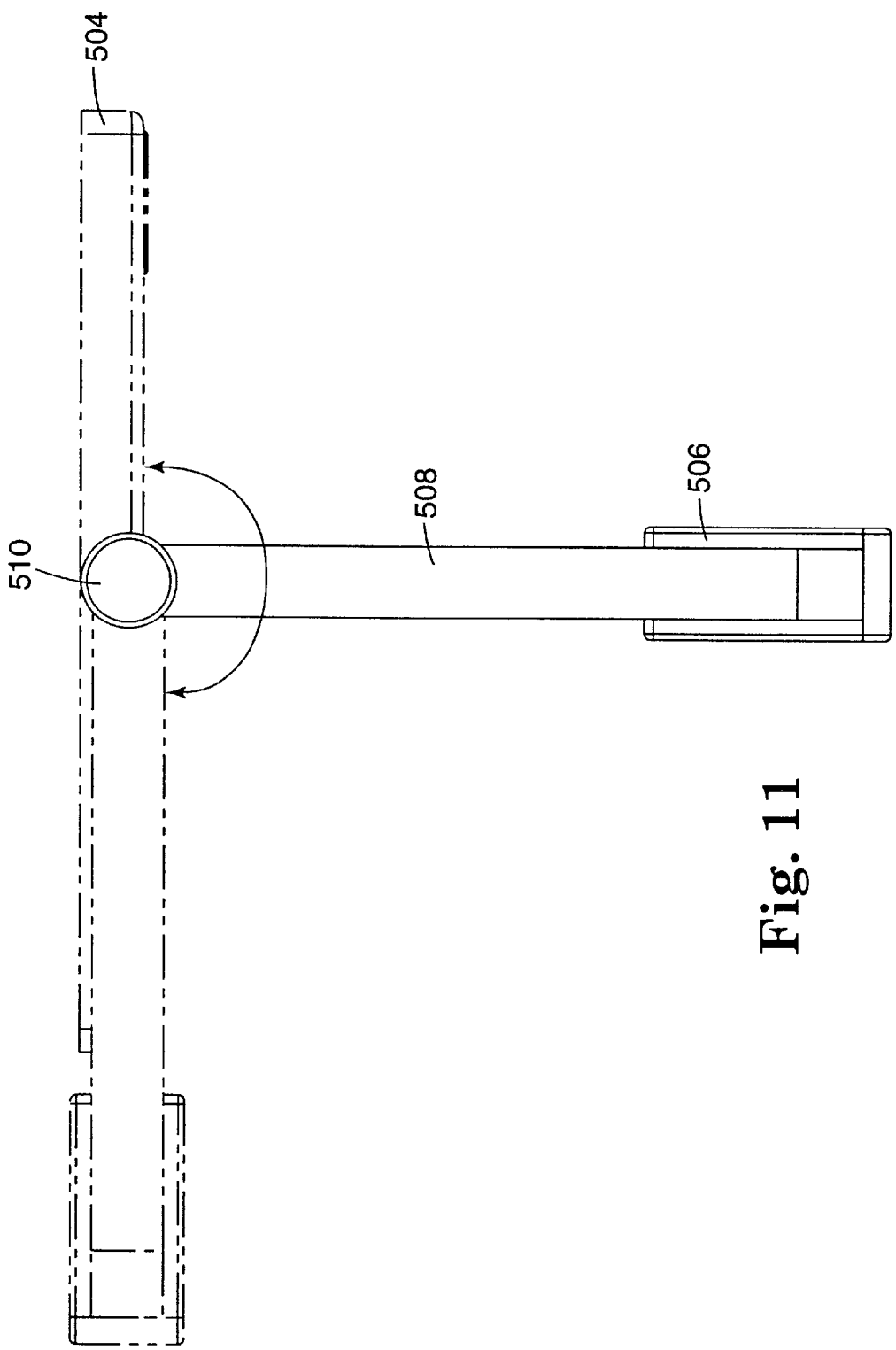
FIG. 11 is a top plan view of the integrated front projection system illustrated in FIG. 10.

FIG. 10 illustrates a fifth exemplary embodiment of a projection system 500 in accordance with the present invention. In the projection system 500, the power supply electronics 519 may be positioned inside of a frame 504. A hinge 510 couples an arm 508 holding a projector head 506 to the frame 504. Electronic control boards 550 may be positioned within the arm 508. The projection head 506 includes a lamp unit 532, a polarizer 535, optics 536, a transmissive LCD imager 534, and projection lens 540, all aligned in a straight optical path. A fan 530 provides ventilation. As illustrated in FIG. 11, the arm 508 may be rotated about ±90° for storage on the right or the left side.

Figure 12:
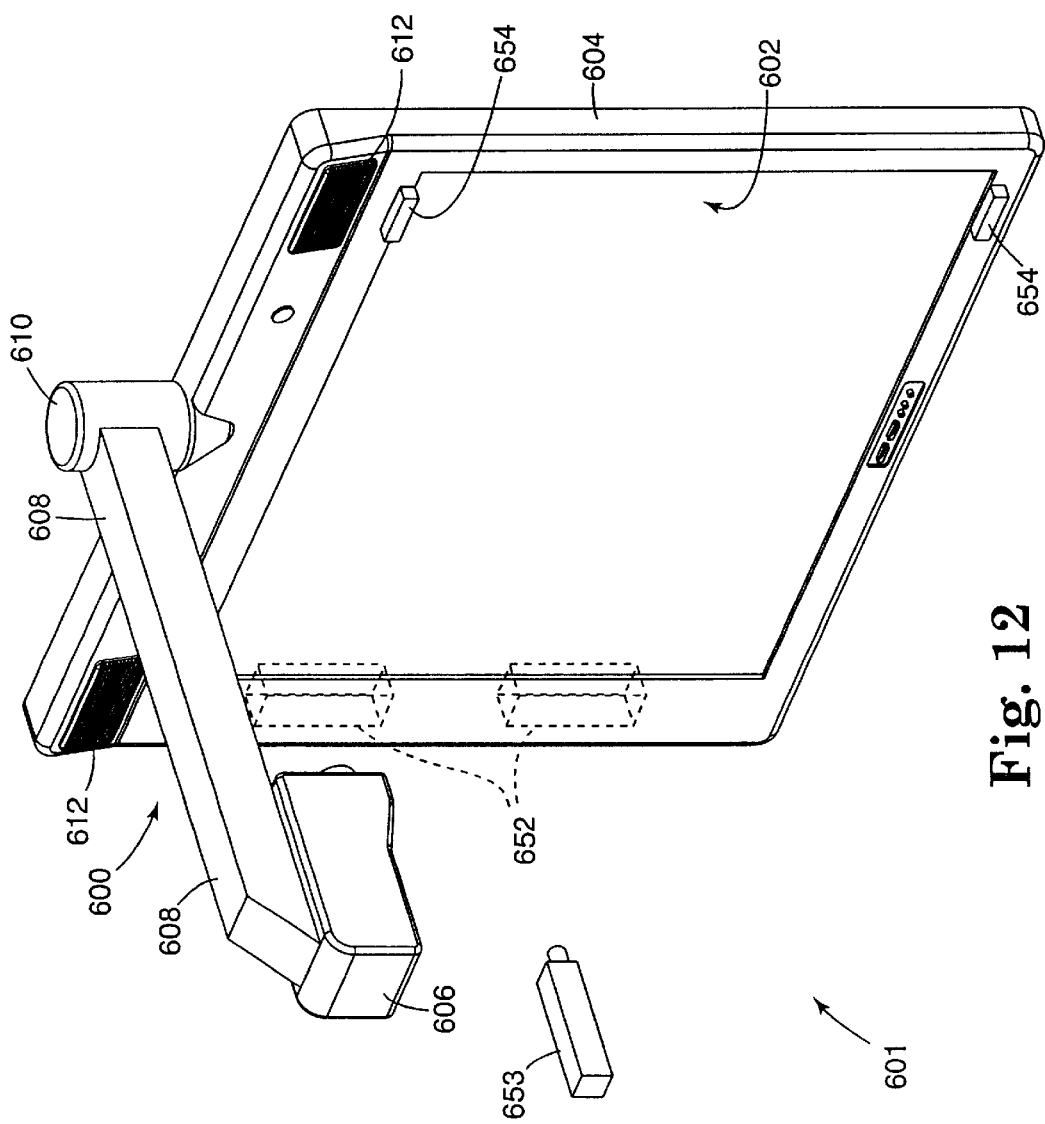
FIG. 12 is a perspective view of a sixth embodiment of an integrated front projection system in accordance with the present invention.
Figure 13:
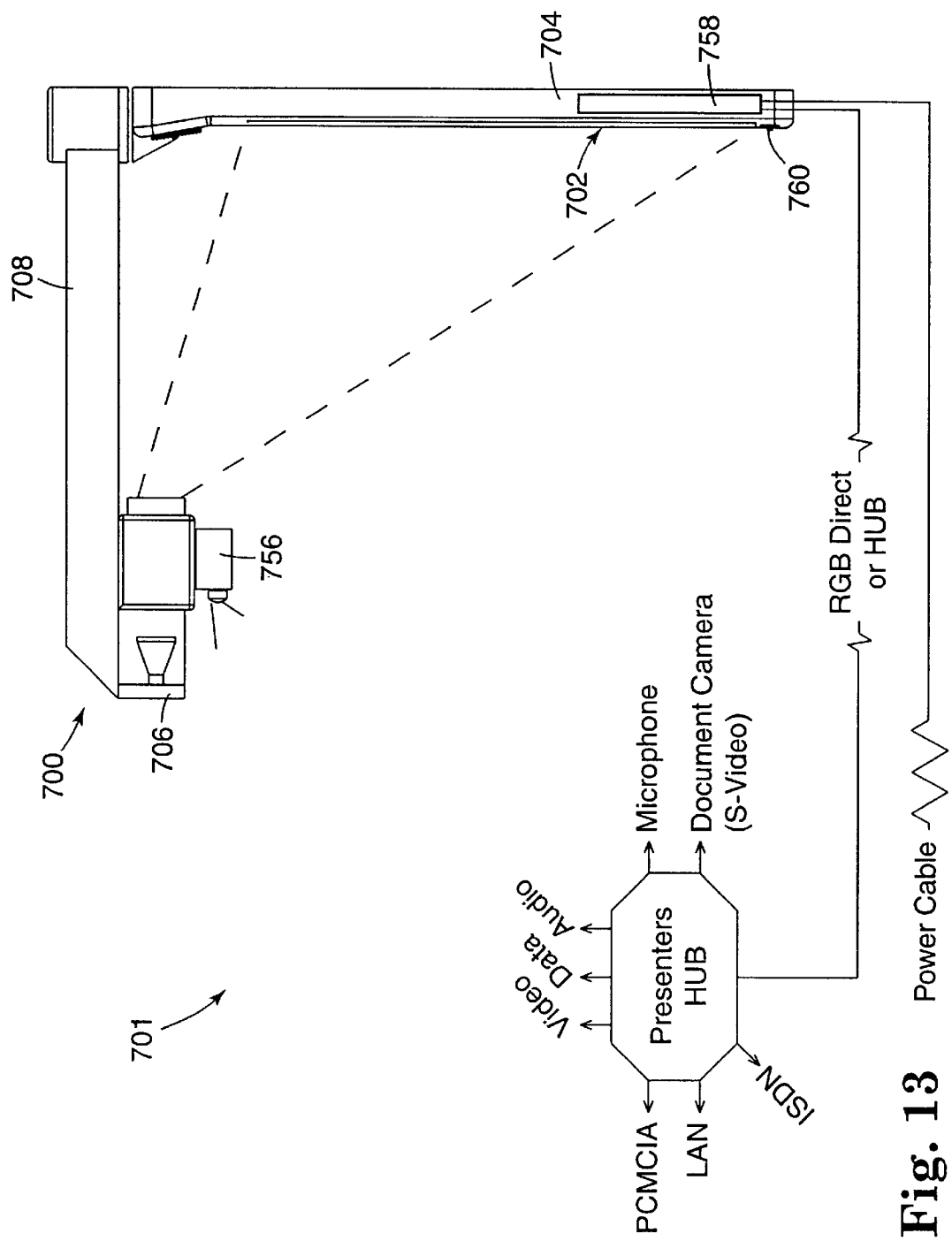
FIG. 13 is a perspective view of a seventh embodiment of an integrated front projection system in accordance with the present invention.

FIGS. 12 and 13 illustrate the versatility of the projection system of the present invention. FIG. 12 illustrates a digital whiteboard system 601 including a projection system 600 in accordance with the present invention and an input device, such as a stylus, 653. The projection system 600 includes integrated electronics for an annotation system 652, as well as LTV, K laser or other type of sensors 654. The sensors 654 may be calibrated to track the movement of the stylus 653 on the surface of the screen. The stylus 653 similarly may include transmitters and/or sensors to aid in tracking and to coordinate timing or control signals with electronics 652. The screen 602 may be coated to allow for erasable whiteboard use. The integrated electronics 652 may include a CPU.

FIG. 13 illustrates a videoconferencing and/or data conferencing system 701, including a projection system 700 in accordance with the present invention. A camera 756, such as a CMOS or CCD camera, may be mounted on the projection head 706 or on the frame 704. The camera 756 may pivot to capture a presenter or to capture documents placed on the screen 702. Alternatively, additional cameras may be directed to the presenter and to the screen. Again, the screen may be coated to act as an erasable whiteboard. The camera 756 may be directly coupled to a CPU 758 integrally placed within the frame 704. A microphone 760 also may be placed within the frame 704. Additional electronic modules, such as a tuner, network card, sound card, video card, communication devices, and others may be placed within the frame 704.

Those skilled in the art will readily appreciate that elements of the present invention may be combined, separately or in one system, to provide videoconferencing, dataconferencing, and electronic whiteboard functions, as well a any other function where a light and compact display system may be useful.

As the system of the present invention is designed to optimize the projection image at the predetermined projection position, no set-up adjustments are necessary to the optics, mechanics, or electronics and optimal on-screen performance is consistently offered. The integral structure of the system 100 allows for easier storage and portability and avoids cabling and positioning associated with the use of traditional projectors.

Those skilled in the art will appreciate that the present invention may be used with a variety of different optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A front image projection device, comprising:
   projection components operable to project an input image onto a projection screen to produce a screen image;
   illumination components coupled to the projection components; and
   image generating components operable to generate the input image, the image generating components comprising a shaped imager component physically configured to pre-distort the input image to compensate at least in part for distortion in the displayed screen image, the physical configuration being determined at least in part from a ray trace.

2. The front image projection device of claim 1, wherein the ray trace comprises an actual ray trace through the projection device.

3. The front image projection device of claim 1, wherein the ray trace comprises a modeled ray trace through the projection device.

4. The front image projection device of claim 1, wherein the projection screen is coupled to and integrated with the projection device.

5. The front image projection device of claim 1, wherein the projection components comprise off-axis optics, and wherein a throw-to-screen diagonal ratio is at most 1.

6. The front image projection device of claim 1, wherein the projection components produce optical and geometric distortion in the screen image with respect to the input image.

7. The front image projection device of claim 6, wherein the shaped imager component has a geometric shape configured to compensate for the optical and geometric distortion of the projection components.

8. The front projection system of claim 7, wherein the geometric shape comprises a curved top, a curved bottom and curved sides.

9. The front projection system of claim 8, wherein the shaped imager component has a plurality of rows of pixels.

10. The front image projection system of claim 9, wherein the number of pixels per row are the same and wherein the spacing between each pixel within a given row is different for different rows of pixels.

11. An integrated front image projection system, comprising:
   a front projection screen;
   a movable arm coupled to the front projection screen, the arm having a storage position and a projection position;
   a front projection head coupled to the arm distal the front projection screen;
   projection components housed within the front projection head, the projection components operable to project an input image onto a projection screen thereby displaying a screen image;
   illumination components coupled to the projection components; and
   image generating components operable to generate the input image, the image generating components comprising a shaped imager component physically configured to pre-distort the input image to compensate at least in part for distortion in the displayed screen image, the physical configuration comprising a geometric shape having a curved top, a curved bottom and curved sides.

12. The integrated front image projection system of claim 11, wherein the geometric shape is determined at least in part from a ray trace.

13. The integrated front projection system of claim 11, wherein the projection components comprise off-axis optics, and wherein a throw-to-screen diagonal ratio of at most 1.

14. The integrated front projection system of claim 11, wherein the projection components produce optical and geometric distortion in the screen image with respect to the input image.

15. A method for projecting a corrected screen image with a front projection device, comprising:
   providing a front projection device configured to project an input image onto a projection screen thereby displaying a screen image;
   compensating for distortion in the screen image caused by components of the front projection device at least in part by utilizing a shaped imager component physically configured to pre-distort an input image, the physical configuration comprising a geometric shape having a curved top, a curved bottom and curved sides; and
   determining the geometric shape at least in part from a ray trace.

16. The method for projecting a corrected screen image with a front projection device, comprising:
   providing a front projecting device configured to project an input image onto a projection screen thereby displaying a screen image;
   compensating for distortion in the screen image caused by components of the front projection device at least in part by utilizing a shaped imager component physically configured to pre-distort an input image, the physical configuration comprising a geometric shape having a curved top, a curved bottom and curved sides; and
   projecting the input image with the front projection device to form a screen image that has distortion corrected by the shaped imager,
   wherein the projecting is accomplished using projection components that comprise off-axis optics, and wherein a throw-to-screen diagonal ratio of at most 1.

17. An imager for a projection system comprising a shaped imager component physically configured with a curved top, a curved bottom and curved sides to pre-distort an input image to compensate at least in part for expected distortion in a projected image, wherein the physical configuration comprises features determined from a modeled or actual ray trace through the projection system.

18. A method for determining a physical configuration for a shaped imager to provide distortion correction in a projected image, comprising:
   determining optical projection parameters for the projection system including projection angle and throw ratio;
   conducting a ray trace of the projection system to determine distortion in a projected image; and
   utilizing the ray trace to physically configure a shaped imager to correct at least in part for the distortion of the projected image.

19. The method of claim 18, wherein the conducting step comprises modeling the projection system to conduct the ray trace.

20. The method of claim 18, wherein the conducting step comprises conducting an actual ray trace through the projection system.

* * * * *

UNITED STATES PATENT AND TRADEMARK OFFICE
CERTIFICATE OF CORRECTION

PATENT NO. : 6,568,814 B2
DATED : May 27, 2003
INVENTOR(S) : Rodriquez, Ernesto M. Jr.

It is certified that error appears in the above-identified patent and that said Letters Patent is hereby corrected as shown below:

<u>Title page,</u>
Item [75], Inventors, delete "Patricia H. DeLuca" and insert in place thereof
-- Patricia M. Hughes --

<u>Column 2,</u>
Line 16, delete "displays 3 are" and insert in place thereof -- displays are --

<u>Column 3,</u>
Line 63, delete " extinguish an ambient" and insert in place thereof -- extinguish ambient --

<u>Column 4,</u>
Line 1, delete "absorb fight" and insert in place thereof -- absorb light --

<u>Column 5,</u>
Line 43, delete "detailed respects," and insert in place thereof -- detailed aspects, --

<u>Column 6,</u>
Line 21, delete "in is accordance" and insert in place thereof -- in accordance --

<u>Column 12,</u>
Line 64, delete "preset" and insert in place thereof -- present --

<u>Column 14,</u>
Line 5, delete "-2x sec($\theta$)tan ($\alpha$)/2x " and insert in place thereof
-- -2x sec($\theta$)tan ($\alpha$))/2x --

<u>Column 15,</u>
Line 16, delete "project" and insert in place thereof -- projection --

<u>Column 16,</u>
Line 28, delete "such the " and insert in place thereof -- such as the --
Line 36, delete "150" and insert in place thereof -- 15° --
Line 54, delete "points four" and insert in place thereof -- points define the four --

UNITED STATES PATENT AND TRADEMARK OFFICE
CERTIFICATE OF CORRECTION

PATENT NO. : 6,568,814 B2
DATED : May 27, 2003
INVENTOR(S) : Rodriguez, Ernesto M. Jr.

It is certified that error appears in the above-identified patent and that said Letters Patent is hereby corrected as shown below:

<u>Column 17,</u>
Line 26, delete "vectors from" and insert in place thereof -- vectors from the points EP2 through the pupil point PP can be defined as V2. --
Line 32, delete "be PP" and insert in place thereof -- be defined by calculating each point where a line from the points EP2 through the pupil point PP --

<u>Column 18,</u>
Line 43, delete "elements carry" and insert in place thereof -- elements in each row of distortion correcting imager 832. This allows the pre-distorted image to carry --

Signed and Sealed this

Eighth Day of June, 2004

JON W. DUDAS
*Acting Director of the United States Patent and Trademark Office*